UNITED STATES PATENT OFFICE 2,541,990

PROCESSES FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application November 12, 1948, Serial No. 59,773

19 Claims. (Cl. 252—342)

This invention relates to processes or procedures particularly adapted for preventing, breaking, or resolving emulsions of the water-in-oil type, and particularly petroleum emulsions. This invention is a continuation-in-part of our co-pending applications Serial Nos. 8,722 and 8,723, both filed February 16, 1948 (now Patents Nos. 2,499,365 and 2,499,366, respectively, both dated March 7, 1950), and also a continuation-in-part of our co-pending application Serial No. 751,624, filed May 31, 1947 (now abandoned), which co-pending application is, in turn, a continuation-in-part of three previous applications, to wit, Serial Nos. 518,660, 518,661 and 518,662, all filed January 17, 1944 (all three now abandoned).

Complementary to the above aspect of our invention is our companion invention concerned with the new chemical products or compounds used as the demulsifying agents in the herein described processes or procedures for resolving emulsions, as well as the application of such chemical compounds, products, and the like, in various other arts and industries, along with methods for manufacturing said new chemical products or compounds which are of outstanding value in demulsification. See our co-pending application Serial No. 59,774, filed November 12, 1948.

See our co-pending application Serial No. 59,775, filed November 12, 1948.

Our invention provides an economical and rapid process for resolving petroleum emulsions of the water-in-oil type, that are commonly referred to as "cut oil," "roily oil," emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil and relatively soft waters or weak brines. Controlled emulsification and subsequent demulsification, under conditions just mentioned, are of significant value in removing impurities, particularly inorganic salts, from pipeline oil.

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

Briefly stated, the present process is concerned with breaking or resolving emulsions by means of certain synthetic products which are oxyalkylated derivatives of certain resins, as hereinafter specified.

Thus, the present process is concerned with breaking petroleum emulsions of the water-in-oil type, characterized by subjecting the emulsion to the action of a demulsifier including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble, hydroxyacetic acid-esterified alkylene oxide-modified phenol-aldehyde resin; said resin being derived by reaction between a difunctional monohydric phenol and an aldehyde having not over 8 carbon atoms and reactive towards said phenol; said resin being formed in the substantial absence of trifunctional phenols; said phenol being of the formula:

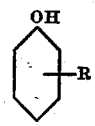

in which R is a hydrocarbon radical having at least 4 and not more than 12 carbon atoms and substituted in the 2,4,6 position; said resin being reacted with the aforementioned alkylene oxide so as to convert at least a majority of the phenolic hydroxyls per resin molecule into aliphatic hydroxyl radicals, but in a molecular proportion so that less than two moles of the alkylene oxide are used for each phenolic hydroxyl; said alkylene oxide-modified phenol-aldehyde resin being reacted with hydroxyacetic acid so as to convert at least a majority of the alkanol radicals replacing the phenolic hydroxyl radicals, but, in any event, at least two such alkanol radicals into the corresponding hydroxyacetic acid ester radicals, and, finally said esterified alkylene oxide-modified phenol-aldehyde resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least two moles of alkylene oxide calculated on a total basis, both before and after esterification, be introduced for each phenolic nucleus present in the original unmodified phenol-aldehyde resin; and with the final proviso that the hydrophile properties of said final oxyalkylated resin in an equal weight of xylene are sufficient to produce an emulsion when said xylene solution is shaken vigorously with one to three volumes of water. In its simplest aspect the demulsifiers may be exemplified by the following illustration. Ordinary phenol or meta-cresol reacts rapidly with an aldehyde to give a resin. This is true of other phenols, such as difunctional phenols. The reactivity of the ortho or para-hydrogen atoms is directly related to the phenolic structure. When the phenolic structure is altered, as, for example, conversion into a hydroxyether, such as the following:

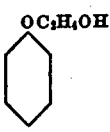

the reactivity of the para and ortho hydrogen atoms is either eliminated, as far as an aldehyde is concerned, or greatly reduced.

As far as we we are aware, if such phenol is substituted even further, as, for example, the same derivative of difunctional phenol having the alkyl radical R in the para position, as illustrated by the following formula:

such compound is comparatively inactive towards aldehydes and if it forms resins at all, presumably under some conditions which as yet have not been determined.

What has been said in regard to the previous compound applies with even greater force and effect if there were further modification, such as the formation of an ester, particularly an ester of a hydroxyacetic acid in which the hydroxyl is a primary alcoholic hydroxyl. Such compound may be illustrated by the following formula:

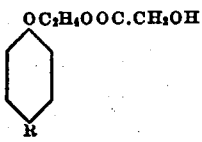

If it were possible to take a chemical compound of the above formula and resinify it by reaction with formaldehyde, for example, one would obtain a resin in which the structural unit can be depicted by the following formula:

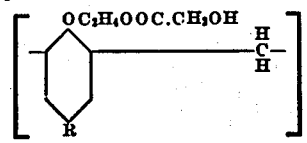

If such water-insoluble resin were then subjected to oxyalkylation, particularly oxyethylation, one would obtain a water-soluble compound, which, in an idealized manner, may be depicted as having a structural unit, such as the following:

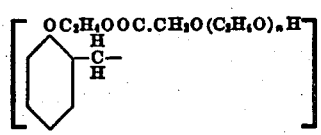

$n=1$ to 20, at least sufficient to give surface-activity, as subsequently described Such oxyalkylated resin is the demulsifier, or, at least, exemplifies one important aspect of the demulsifier employed in the instant invention.

Hypothetically, at least, one may consider the resin depicted by the previous formula as a phenolic resin, such as contemplated as a raw material in our previously mentioned co-pending applications Serial Nos. 8,722 and 8,723, both filed February 16, 1948. Actually, such resins are not obtainable from the ester, for reasons which have been indicated, and thus, must be obtained indirectly, i. e., by first producing the resin from a difunctional phenol and an aldehyde, subjecting such resin to reaction with less than two moles of ethylene oxide or the like for each phenolic hydroxyl, then esterifying the alcoholic radicals, or substantially all the alcoholic radicals, with hydroxyacetic acid, and then subjecting such intermediate to a further reaction with an alkylene oxide, particularly ethylene oxide, as hereinafter described. Such oxyalkylated product then becomes the demulsifier employed in the instant process.

For purpose of convenience, what is said hereinafter will be divided into five parts.

Part 1 will be concerned with the production of the resin from a difunctional phenol and an aldehyde.

Part 2 will be concerned with the treatment of such resin, with at least moderate amounts of alkylene oxide per phenolic resin, but, in any event, less than two moles of the alkylene oxide for each phenolic hydroxyl, and preferably, in the ratio of one mole of alkylene oxide, such as ethylene oxide, for each phenolic hydroxyl, as hereinafter specified.

Part 3 will be concerned with the conversion of such hydroxylated material into the hydroxyacetic acid ester by reaction with sufficient hydroxyacetic acid or its equivalent to convert all or at least the majority of all the hydroxyl radicals present into ester radicals.

Part 4. Such intermediate, to wit, the partial or complete est_r and preferably the latter, is then subjected to oxyalkylation, preferably oxyethylation, so as to yield a product having distinct hydrophile or surface-active properties, as hereinafter described.

Part 5 is concerned with the use of such oxyalkylated d rivatives as demulsifiers, as hereinafter described.

PART 1

As to the preparation of the phenol-aldehyde resins, reference is made to our co-pending applications Serial Nos. 8,730 (now abandoned) and 8,731, both filed February 16, 1948. In such co-pending applications we described a fusible, organic solvent-soluble, water-insoluble resin polymer of the formula:

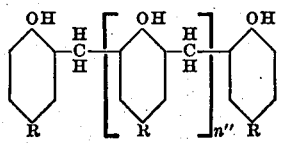

In such idealized representation $n''$ is a numeral varying from 1 to 13, or even more, provided that the r.sin is fusible and organic solvent-soluble. R is a hydrocarbon radical having at least 4 and not over 8 carbon atoms. In the instant application R may have as many as 12 carbon atoms, as in the case of a resin obtained from a dodecyl phenol. In the instant invention it may be first suitable to describe the alkylene oxides employed as reactants, then the aldehydes, and finally the phenols, for the reason that the latter require a more elaborate description.

The alkylene oxides which may be used are the alpha-beta oxides having not more than 4 carbon atoms, to wit, ethylene oxide, alpha-beta propylene oxide, alpha-beta butylene oxide, glycide, and methylglycide.

Any aldehyde capable of forming a methylol or a substituted methylol group and having not more than 8 carbon atoms is satisfactory, so long as it does not possess some other functional group or structure which will conflict with the resinification reaction or with the subsequent oxyalkylation of the resin, but the use of formaldehyde, in its cheapest form of an aqueous solution, for the production of the resins, is particularly advantageous. Solid polymers of formaldehyde are more expensive and higher aldehydes are both less reactive, and are more expensive. Furthermore, the higher aldehydes may undergo other reactions which are not desirable, thus introducing difficulties into the resinification step. Thus acetaldehyde, for example, may undergo an aldol condensation, and it and most of the higher aldehydes enter into self-resinification when treated with strong acids or alkalis. On the other hand, higher aldehydes frequently beneficially affect the solubility and fusibility of a resin. This is illustrated, for example, by the different characteristics of the resin prepared from paratertiary amyl phenol and formaldehyde, on one hand, and a comparable product prepared from the same phenolic reactant and heptaldehyde, on the other hand. The former, as shown in certain subsequent examples, is a hard, brittle solid, whereas, the latter is soft and tacky, and obviously easier to handle in the subsequent oxyalkylation procedure.

Cyclic aldehydes may be employed, particularly benzaldehyde. The employment of furfural requires careful control, for the reason that, in addition to its aldehydic function, furfural can form vinyl condensations, by virtue of its unsaturated structure. The production of resins from furfural for use in preparing products for the present process, is most conveniently conducted with weak alkaline catalysts and often with alkali metal carbonates. Useful aldehydes, in addition to formaldehyde, are acetaldehyde, propionic aldehyde, butyraldehyde, 2-ethylhexanal, ethylbutyraldehyde, heptaldehyde, and benzaldehyde, furfural and glyoxal. It would appear that the use of glyoxal should be avoided, due to the fact that it is tetrafunctional. However, our experience has been that, in resin manufacture and particularly as described herein, apparently only one of the aldehydic functions enters into the resinification reaction. The inability of the other aldehydic function to enter into the reaction is presumably due to steric hindrance. Needless to say, one can use a mixture of two or more aldehydes, although usually this has no advantage.

Resins of the kind which are used as intermediates in this invention are obtained with the use of acid catalysts or alkaline catalysts, or without the use of any catalyst at all. Among the useful alkaline catalysts are ammonia, amines, and quaternary ammonium bases. It is generally accepted that when ammonia and amines are employed as catalysts, they enter into the condensation reaction, and, in fact, may operate by initial combination with the aldehydic reactant. The compound hexamethylenetetramine illustrates such a combination. In light of these various reactions, it becomes difficult to present any formula which would depict the structure of the various resins prior to oxyalkylation. More will be said subsequently as to the difference between the use of an alkaline catalyst and an acid catalyst; even in the use of an alkaline catalyst there is considerable evidence to indicate that the products are not identical where different basic materials are employed. The basic materials employed include not only those previously enumerated, but also the hydroxides of the alkali metals, hydroxides of the alkaline earth metals, salts of strong bases and weak acids, such as sodium acetate, etc.

Suitable phenolic reactants include the following: Para-tertiarybutylphenol; para-secondary-butylphenol; para-tertiary-amylphenol; para-secondary-amylphenol; para-tertiary-hexylphenol; para-isooctylphenol; ortho-phenylphenol; para-phenylphenol; ortho-benzylphenol; para-benzylphenol; and para-cyclohexylphenol, and the corresponding ortho-para-substituted meta-cresols and 3,5-xylenols. Similarly, one may use para- or ortho-nonylphenol or a mixture, para- or ortho-decylphenol or a mixture, menthylphenol, or para- or ortho-dodecylphenol.

For convenience, the phenol has previously been referred to as monocyclic, in order to differentiate from fused nucleus polycyclic phenols, such as substituted naphthols. Specifically, "monocyclic" is limited to the nucleus in which the hydroxyl radical is attached. Broadly speaking, where a substituent is cyclic, particularly aryl, obviously in the usual sense such phenol is actually polycyclic, although the phenolic hydroxyl is not attached to a fused polycyclic nucleus. Stated another way, phenols in which the hydroxyl group is directly attached to a condensed or fused polycyclic structure, are excluded. This matter, however, is clarified by the following consideration. The phenols herein contemplated for reaction may be indicated by the following formula:

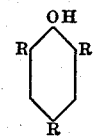

in which R is selected from the class consisting of hydrogen atoms and hydrocarbon radicals having at least 4 carbon atoms and not more than 12 carbon atoms, with the proviso that one occurrence of R is the hydrocarbon substituent and the other two occurrences are hydrogen atoms, and with the further provision that one or both of the 3 and 5 positions may be methyl substituted.

The above formula possibly can be restated more conveniently in the following manner, to wit, that the phenol employed is of the following formula, with the proviso that R is a hydrocarbon substituent located in the 2,4,6 position, again with the provision as to 3 or 3,5 methyl substitution. This is conventional nomenclature, numbering the various positions in the usual clockwise manner, beginning with the hydroxyl position as one:

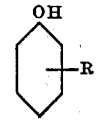

The manufacture of thermoplastic phenol-aldehyde resins, particularly from formaldehyde and a difunctional phenol, i. e., a phenol in which one of the three reactive positions (2,4,6) has been substituted by a hydrocarbon group, and particularly by one having at least 4 carbon atoms and not more than 12 carbon atoms, is well known. As has been previously pointed out, there is no objection to a methyl radical provided it is present in the 3 or 5 postiion.

Thermoplastic or fusible phenol-aldehyde resins are usually manufactured for the varnish trade and oil solubility is of prime importance. For this reason, the common reactants employed are butylated phenols, amylated phenols, phenylphenols, etc. The methods employed in manufacturing such resins are similar to those employed in the manufacture of ordinary phenol-formaldehyde resins, in that either an acid or alkaline catalyst is usually employed. The procedure usually differs from that employed in the manufacture of ordinary phenol-aldehyde resins in that phenol, being water-soluble, reacts readily with an aqueous aldehyde solution without further difficulty, while when a water-insoluble phenol is employed some modification is usually adopted to increase the interfacial surface and thus cause reaction to take place. A common solvent is sometimes employed. Another procedure employs rather severe agitation to create a large interfacial area. Once the reaction starts to a moderate degree, it is possible that both reactants are somewhat soluble in the partially reacted mass and assist in hastening the reaction. We have found it desirable to employ a small proportion of an organic sulfo-acid as a catalyst, either alone or along with a mineral acid like sulfuric or hydrochloric acid. For example, alkylated aromatic sulfonic acids are effectively employed. Since commercial forms of such acids are commonly their alkali salts, it is sometimes convenient to use a small quantity of such alkali salt plus a small quantity of strong mineral acid, as shown in the examples below. If desired, such organic sulfo-acids may be prepared in situ in the phenol employed, by reacting concentrated sulfuric acid with a small proportion of the phenol. In such cases where xylene is used as a solvent and concentrated sulfuric acid is employed, some sulfonation of the xylene probably occurs to produce the sulfo-acid. Addition of a solvent such as xylene is advantageous as hereinafter described in detail. Another variation of procedure is to employ such organic sulfo-acids, in the form of their salts, in connection with an alkali-catalyzed resinification procedure. Detailed examples are included subsequently.

Another advantage in the manufacture of the thermoplastic or fusible type of resin by the acid catalytic procedure is that, since a difunctional phenol is employed, an excess of an aldehyde, for instance formaldehyde, may be employed without too marked a change in conditions of reaction and ultimate product. There is usually little, if any, advantage, however, in using an excess over and above the stoichiometric proportions for the reason that such excess may be lost and wasted. For all practical purposes the molar ratio of formaldehyde to phenol may be limited to 0.9 to 1.2, with 1.05 as the preferred ratio, or sufficient, at least theoretically, to convert the remaining reactive hydrogen atom of each terminal phenolic nucleus. Sometimes when higher aldehydes are used an excess of aldehydic reactant can be distilled off and thus recovered from the reaction mass. This same procedure may be used with formaldehyde and excess reactant recovered.

When an alkaline catalyst is used the amount of aldehyde, particularly formaldehyde, may be increased over the simple stoichiometric ratio of one-to-one or thereabouts. With the use of alkaline catalyst it has been recognized that considerably increased amounts of formaldehyde may be used, as much as two moles of formaldehyde, for example, per mole of phenol, or even more, with the result that only a small part of such aldehyde remains uncombined or is subsequently liberated during resinification. Structures which have been advanced to explain such increased use of aldehydes are the following:

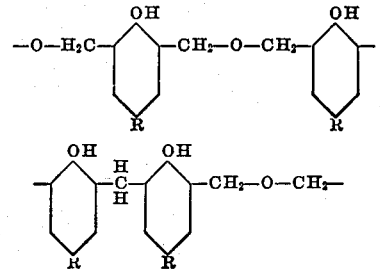

Such structures may lead to the production of cyclic polymers instead of linear polymers. For this reason, it has been previously pointed out that, although linear polymers have by far the most important significance, the present invention does not exclude resins of such cyclic structures.

Sometimes conventional resinification procedure is employed using either acid or alkaline catalysts to produce low-stage resins. Such resins may be employed as such, or may be altered or converted into high-stage resins, or in any event, into resins of higher molecular weight, by heating along with the employment of vacuum so as to split off water or formaldehyde, or both. Generally speaking, temperatures employed, particularly with vacuum, may be in the neighborhood of 175° to 250° C., or thereabouts.

It may be well to point out, however, that the amount of formaldehyde used may and does usually affect the length of the resin chain. Increasing the amount of the aldehyde, such as formaldehyde, usually increases the size or molecular weight of the polymer.

In the hereto appended claims there is specified, among other things, the resin polymer containing at least 3 phenolic nuclei. Such minimum molecular size is most conveniently determined as a rule by cryoscopic method using benzene, or some other suitable solvent, for instance, one of those mentioned elsewhere herein as a solvent for such resins. As a matter of fact, using the procedures herein described or any conventional resinification procedure will yield products usually having definitely in excess of 3 nuclei. In other words, a resin having an average of 4, 5 or 5½ nuclei per unit is apt to be formed as a minimum in resinification, except under certain special conditions where dimerization may occur.

However, if resins are prepared at substantially higher temperatures, substituting cymene, tetralin, etc., or some other suitable solvent which boils or refluxes at a higher temperature, instead of xylene, in subsequent examples, and if one doubles or triples the amount of catalyst, doubles or triples the time of refluxing, uses a marked excess of formaldehyde or other aldehyde, then the average size of the resin is apt to be distinctly over the above values, for example, it may average 7 to 15 units. Sometimes the expression "low-stage" resin or "low-stage" intermediate is employed to mean a stage having 6 or 7 units or even less. In the appended claims we have used "low-stage" to mean 3 to 7 units based on average molecular weight.

The molecular weight determinations, of course, require that the product be completely soluble in the particular solvent selected as, for instance, benzene. The molecular weight determination of such solution may involve either the freezing point as in the cryoscopic method, or, less conveniently perhaps, the boiling point in an ebullioscopic method. The advantage of the ebullioscopic method is that, in comparison with the cryoscopic method, it is more apt to insure complete solubility. One such common method to employ is that of Menzies and Wright (see J. Am. Chem. Soc. 43, 2309 and 2314 (1921)). Any suitable method for determining molecular weights will serve, although almost any procedure adopted has inherent limitations. A good method for determining the molecular weights of resins, especially solvent-soluble resins, is the cryoscopic procedure of Krumbhaar which employs diphenylamine as a solvent (see "Coating and Ink Resins," page 157, Reinhold Publishing Co. 1947).

Subsequent examples will illustrate the use of an acid catalyst, an alkaline catalyst, and no catalyst. As far as resin manufacture per se is concerned, we prefer to use an acid catalyst, and particularly a mixture of an organic sulfo-acid and a mineral acid, along with a suitable solvent, such as xylene, as hereinafter illustrated in detail. However, we have obtained products from resins obtained by use of an alkaline catalyst which were just as satisfactory as those obtained employing acid catalysts. Sometimes a combination of both types of catalysts is used in different stages of resinification. Resins so obtained are also perfectly satisfactory.

In numerous instances the higher molecular weight resins, i. e., those referred to as high-stage resins, are conveniently obtained by subjecting lower molecular weight resins to vacuum distillation and heating. Although such procedure sometimes removes only a modest amount or even perhaps no low polymer, yet it is almost certain to produce further polymerization. For instance, acid catalyzed resins obtained in the usual manner and having a molecular weight indicating the presence of approximately 4 phenolic units or thereabouts may be subjected to such treatment, with the result that one obtains a resin having approximately double this molecular weight. The usual procedure is to use a secondary step, heating the resin in the presence or absence of an inert gas, including steam, or by use of vacuum.

We have found that under the usual conditions of resinification employing phenols of the kind here described, there is little or no tendency to form binuclear compounds, i. e., dimers, resulting from the combination, for example, of 2 moles of a phenol and one mole of formaldehyde, particularly where the substituent has 4 or 5 carbon atoms. Where the number of carbon atoms in a substituent approximates the upper limit specified herein, there may be some tendency to dimerization. The usual procedure to obtain a dimer involves an enormously large excess of the phenol, for instance, 8 to 10 moles per mole of aldehyde. Substituted dihydroxydiphenylmethanes obtained from substituted phenols are not resins as that term is used herein.

Although any conventional procedure ordinarily employed may be used in the manufacture of the herein contemplated resins or, for that matter, such resins may be purchased in the open market, we have found it particularly desirable to use the procedures described elsewhere herein, and employing a combination of an organic sulfo-acid and a mineral acid as a catalyst, and xylene as a solvent. By way of illustration, certain subsequent examples are included, but it is to be understood the herein described invention is not concerned with the resins per se or with any particular method of manufacture but is concerned with the use of reactants obtained by the subsequent oxyalkylation thereof. The phenol-aldehyde resins may be prepared in any suitable manner.

Oxyalkylation, particularly oxyethylation which is the preferred reaction, depends on contact between a non-gaseous phase and a gaseous phase. It can, for example, be carried out by melting the thermoplastic resin and subjecting it to treatment with ethylene oxide or the like, or by treating a suitable solution or suspension. Since the melting points of the resins are often higher than desired in the initial stage of oxyethylation, we have found it advantageous to use a solution or suspension of thermoplastic resin in an inert solvent such as xylene. Under such circumstances, the resin obtained in the usual manner is dissolved by heating in xylene under a reflux condenser or in any other suitable manner. Since xylene or an equivalent inert solvent is present or may be present during oxyalkylation, it is obvious there is no objection to having a solvent present during the resinifying stage if, in addition to being inert towards the resin, it is also inert towards the reactants and also inert towards water. Numerous solvents, particularly of aromatic or cyclic nature, are suitably adapted for such use. Examples of such solvents are xylene, cymene, ethyl benzene, propyl benzene, mesitylene, decalin (decahydronaphthalene), tetralin (tetrahydronaphthalene), ethylene glycol diethylether, diethylene glycol diethylether, and tetraethylene glycol dimethylether, or mixtures of one or more. Solvents such as dichloroethylether, or dichloropropylether may be employed either alone or in mixture but have the objection that the chlorine atom in the compound may slowly combine with the alkaline catalyst employed in oxyethylation. Suitable solvents may be selected from this group for molecular weight determinations.

The use of such solvents is a convenient expedient in the manufacture of the thermoplastic resins, particularly since the solvent gives a more liquid reaction mass and thus prevents overheating, and also because the solvent can be employed in connection with a reflux condenser and a water trap to assist in the removal of water of reaction and also water present as part of the formaldehyde reactant when an aqueous solution of formaldehyde is used. Such aqueous solution, of course, with the ordinary product of commerce containing about 37½% to 40% formaldehyde, is the preferred reactant. When such solvent is used it is advantageously added at the beginning of the resinification procedure or before the reaction has proceeded very far.

The solvent can be removed afterwards by distillation with or without the use of vacuum, and a final higher temperature can be employed to complete reaction if desired. In many instances it is most desirable to permit part of the solvent, particularly when it is inexpensive, e. g., xylene, to remain behind in a predetermined amount so as to have a resin which can be handled more conveniently in the oxyalkylation stage. If a more expensive solvent, such as decalin, is employed, xylene or other inexpensive solvent may be added after the removal of decalin, if desired.

In preparing resins from difunctional phenols it is common to employ reactants of technical grade. The substituted phenols herein contemplated are usually derived from hydroxybenzene. As a rule, such substituted phenols are comparatively free from unsubstituted phenol. We have generally found that the amount present is considerably less than 1% and not infrequently in the neighborhood of $\frac{1}{10}$ of 1%, or even less. The amount of the usual trifunctional phenol, such as hydroxybenzene or metacresol, which can be tolerated is determined by the fact that actual cross-linking, if it takes place even infrequently, must not be sufficient to cause insolubility at the completion of the resinification stage or the lack of hydrophile properties at the completion of the oxyalkylation stage.

The exclusion of such trifunctional phenols as hydroxybenzene or metacresol is not based on the fact that the mere random or occasional inclusion of an unsubstituted phenyl nucleus in the resin molecule or in one of several molecules, for example, markedly alters the characteristics of the oxyalkylated derivative. The presence of a phenyl radical having a reactive hydrogen atom available or having a hydroxymethylol or a substituted hydroxymethylol group present is a potential source of cross-linking either during resinification or oxyalkylation. Cross-linking leads either to insoluble resins or to non-hydrophilic products resulting from the oxyalkylation procedure. With this rationale understood, it is obvious that trifunctional phenols are tolerable only in a minor proportion and should not be present to the extent that insolubility is produced in the resins, or that the product resulting from oxyalkylation is gelatinous, rubbery, or at least not hydrophile. As to the rationale of resinification, note particularly what is said hereafter in differentiating between resoles, Novolaks, and resins obtained solely from difunctional phenols.

Previous reference has been made to the fact that fusible organic solvent-soluble resins are usually linear but may be cyclic. Such more complicated structure may be formed, particularly if a resin prepared in the usual manner is converted into a higher stage resin by heat treatment in vacuum, as previously mentioned. This again is a reason for avoiding any opportunity for cross-linking due to the presence of any appreciable amount of trifunctional phenol. In other words, the presence of such reactant may cause cross-linking in a conventional resinification procedure, or in the oxyalkylation procedure, or in the heat and vacuum treatment, if it is employed as part of resin manufacture.

Our routine procedure in examining the phenol for suitability as a raw material to be used in preparing an intermediate which is subsequently converted into a more complicated derivative for practicing the present invention, is to use the same procedure as if the resin derived from the phenol is intended for extensive oxyalkylation, particularly oxyethylation, without the herein included new procedure of interrupting the alkylene oxide chain by a hydroxyacetic acid radical. Stated another way, we simply use the same procedure that we have described in our numerous co-pending applications, particularly aforementioned applications Serial Nos. 8,730 and 8,731, both filed February 16, 1948. Thus, we examine a phenol for suitability as a raw material in this invention by preparing a resin employing formaldehyde in excess (1.2 moles of formaldehyde per mole of phenol) and using an acid catalyst in the manner described in Example 1a of our Patent 2,499,370, granted March 7, 1950. If the resin so obtained is solvent-soluble in any one of the aromatic or other solvents previously referred to, it is then subjected to oxyethylation. During oxyethylation a temperature is employed of approximately 150° to 165° C. with addition of at least 2 and advantageously up to 5 moles of ethylene oxide per phenolic hydroxyl. The oxyethylation is advantageously conducted so as to require from a few minutes up to 5 to 10 hours. If the product so obtained is solvent-soluble and self-dispersing or emulsifiable, or has emulsifying properties, the phenol is perfectly satisfactory from the standpoint of trifunctional phenol content. The solvent may be removed prior to the dispersibility or emulsifiability test. When a product becomes rubbery during oxyalkylation, due to the presence of a small amount of trireactive phenol, as previously mentioned, or for some other reason, it may become extremely insoluble, and no longer qualifies as being hydrophile, as herein specified. Increasing the size of the aldehydic nucleus, for instance, using heptaldehyde instead of formaldehyde, increases tolerance for trifunctional phenol.

The presence of a trifunctional or tetrafunctional phenol (such as resorcinol or bisphenol A) is apt to produce detectable cross-linking and insolubilization, but will not necessarily do so, especially if the proportion is small. Resinification involving difunctional phenols only may also produce insolubilization, although this seems to be an anomaly or a contradiction of what is sometimes said in regard to resinification reactions involving difunctional phenols only. This is presumably due to cross-linking. This appears to be contradictory to what one might expect in light of the theory of functionality in resinification. It is true that under ordinary circumstances, or rather under the circumstances of conventional resin manufacture, the procedures employing difunctional phenols are very apt to, and almost invariably do, yield solvent-soluble, fusible resins. However, when conventional procedures are employed in connection with resins for varnish manufacture or the like, there is involved the matter of color, solubility in oil, etc. When resins of the same type are manufactured for the herein contemplated purpose, i. e., as a raw material to be subjected to oxyalkylation, such criteria of selection are no longer pertinent. Stated another way, one may use more drastic conditions of resinification than those ordinarily employed to produce resins for the present purposes. Such more drastic conditions of resinification may include increased amounts of catalyst, higher temperatures, longer time of reaction, subsequent reaction involving heat alone or in combination with vacuum, etc. Therefore, one is not only concerned with the resinification reactions which yield the bulk of ordinary resins from difunctional phenols but also and particularly with the minor reactions of ordinary resin manufacture which are of importance in the present invention for the reason that they occur under more drastic conditions of resinification which may be employed advantageously at times, and they may lead to cross-linking.

In this connection it may be well to point out that part of these reactions are now understood or explainable to a greater or lesser degree in light of a most recent investigation. Reference is made to the researches of Zinke and his co-workers, Hultzch and his associates, and to von Eulen and his co-workers, and others. As to a bibliography of such investigations, see Carswell, "Phenoplasts," chapter 2. These investigators limited much of their work to reactions involving phenols having two or less reactive hydrogen atoms. Much of what appears in these most recent and most up-to-date investigations is pertinent to the present invention insofar that much of it is referring to resinification involving difunctional phenols.

For the moment, it may be simpler to consider a "most typical type" of fusible resin and forget for the time that such resin, at least under certain circumstances, is susceptible to further complications. Subsequently, in the text, it will be pointed out that cross-linking or reaction with excess formaldehyde may take place, even with one of such "most typical type" resins. This point is made for the reason that insolubles must be avoided in order to obtain the products herein contemplated for use as reactants.

The "typical type" of fusible resin obtained from a para-blocked or ortho-blocked phenol is clearly differentiated from the Novolak type or resole type of resin. Unlike the resole type, such "typical type" para-blocked or ortho-blocked phenol resin may be heated indefinitely without passing into an infusible stage, and in this respect, is similar to a Novolak. Unlike the Novolak type, the addition of a further reactant, for instance, more aldehyde, does not ordinarily alter fusibility of the difunctional phenol-aldehyde type resin; but such addition to a Novolak causes cross-linking by virtue of the available third functional position.

What has been said immediately preceding is subject to modification in this respect: It is well known, for example, that difunctional phenols, for instance, paratertiaryamylphenol, and an aldehyde, particularly formaldehyde, may yield heat-hardenable resins, at least under certain conditions, as, for example, the use of two moles of formaldehyde one of phenol, along with an alkaline catalyst. This peculiar hardening or curing or cross-linking of resins obtained from difunctional phenols has been recognized by various authorities.

The resin herein employed, prior to oxyalkylation and even after the initial oxyalkylation step, i. e., prior to esterification with hydroxyacetic acid, must not be hydrophile or sub-surface-active or surface-active, as hereinafter described. However, after the esterification with hydroxyacetic acid and after the second treatment with an alkylene oxide, the finished product must be hydrophile or sub-surface-active or surface-active, as herein described. This precludes the formation of insolubles during resin manufacture or during the subsequent stages of resin manufacture when heat alone or heat and vacuum, are employed, or in the esterification procedure, or in even the first or second alkylation procedure. In its simplest presentation the rationale of resinification involving formaldehyde, for example, and a difunctional phenol would not be expected to form cross-links. However, cross-linking sometimes occurs and it may reach the objectionable stage. However, provided that the preparation of resins simply takes into cognizance the present knowledge of the subject, and employing preliminary, exploratory routine examination, as herein indicated, there is not the slightest difficulty in preparing a very large number of resins of various types and from various reactants, and by means of different catalysts by different procedures, all of which are eminently suitable for the herein described purpose.

Now returning to the thought that cross-linking can take place, even when difunctional phenols are used exclusively, attention is directed to the following: Somewhere during the course of resin manufacture there may be a potential cross-linking combination formed but actual cross-linking may not take place until the subsequent stage is reached, i. e., heat and vacuum stage, or oxyalkylation stage. This situation may be related or explained in terms of a theory of flaws. or Lockerstellen, which is employed in explaining flaw-forming groups due to the fact that a $CH_2OH$ radical and H atom may not lie in the same plane in the manufacture of ordinary phenol-aldehyde resins.

Secondly, the formation or absence of formation of insolubles may be related to the aldehyde used and the ratio of aldehyde, particularly formaldehyde, insofar that a slight variation may, under circumstances not understandable, produce insolubilization. The formation of the insoluble resin is apparently very sensitive to the quantity of formaldehyde employed and a slight increase in the proportion of formaldehyde may lead to the formation of insoluble gel lumps. The cause of insoluble resin formation is not clear, and nothing is known as to the structure of these resins.

All that has been said previously herein as regards resinification has avoided the specific reference to activity of a methylene hydrogen atom. Actually there is a possibility that under some drastic conditions cross-linking may take place through formaldehyde addition to the methylene bridge, or some other reaction involving a methylene hydrogen atom.

Finally, there is some evidence that, although the meta positions are not ordinarily reactive, possibly at times methylol groups or the like are formed at the meta positions; and if this were the case it may be a suitable explanation of abnormal cross-linking.

Reactivity of a resin towards excess aldehyde, for instance formaldehyde, is not to be taken as a criterion of rejection for use as a reactant. In other words, a phenol-aldehyde resin which is thermoplastic and solvent-soluble, particularly if xylene-soluble, is perfectly satisfactory even though retreatment with more aldehyde may change its characteristics markedly in regard to both fusibility and solubility. Stated another way, as far as resins obtained from difunctional phenols are concerned, they may be either formaldehyde-resistant or not formaldehyde-resistant.

Referring again to the resins herein contemplated as reactants, it is to be noted that they are thermoplastic phenol-aldehyde resins derived from difunctional phenols and are clearly distinguished from Novolaks or resoles. When these resins are produced from difunctional phenols and some of the higher aliphatic aldehydes, such as acetaldehyde, the resultant is often a comparatively soft or pitchlike resin at ordinary temperature. Such resins become comparatively fluid at 110° to 165° C. as a rule and thus can be readily oxyalkylated, preferably oxyethylated, without the use of a solvent.

Reference has been made to the use of the word "fusible." Ordinarily a thermoplastic resin is identified as one which can be heated repeatedly and still not lose its thermoplasticity. It is recognized, however, that one may have a resin which is initially thermoplastic but on repeated heating may become insoluble in an organic solvent, or at least no longer thermoplastic, due to the fact that certain changes take place very slowly. As far as the present invention is concerned, it is obvious that a resin to be suitable need only be sufficiently fusible to permit processing to produce our oxyalkylated products and not yield insolubles or cause insolubilization or gel formation, or rubberiness, as previously described. Thus resins which are, strictly speaking, fusible but not necessarily thermoplastic in the most rigid sense that such terminology would be applied to the mechanical properties of a resin, are useful intermediates. The bulk of all fusible resins of the kind herein described are thermoplastic.

The fusible or thermoplastic resins, or solvent-soluble resins, herein employed as reactants, are water-insoluble, or have no appreciable hydrophile properties. The hydrophile property is introduced by oxyalkylation. In the hereto appended claims and elsewhere the expression "water-insoluble" is used to point out this characteristic of the resins used.

In the manufacture of compounds herein employed, particularly for demulsification, it is obvious that the resins can be obtained by one of a number of procedures. In the first place, suitable resins are marketed by a number of companies and can be purchased in the open market; in the second place, there are a wealth of examples of suitable resins described in the literature. The third procedure is to follow the directions of the present application.

In the hereto appended claims as to the initial oxyalkylated derivative of the water-insoluble, organic solvent-soluble, fusible, resin used as a raw material, it is specified that the ratio of alkylene oxide to phenolic hydroxyls be less than 2 to 1 and at least sufficient to convert a majority of the phenolic hydroxyls on an absolute basis, or phenolic hydroxyls per resin molecule, into alkanol radicals. This simply means the following: In a resin molecule having three phenolic nuclei at least 2 moles be converted; in one having 4 units at least 3; similarly, in regard to one having 5; in regard to one having 6 or 7 at least 4 moles be converted. This calculation, of course, is on a statistical basis, and if an analysis is made for phenolic hydroxyls, all that is necessary is that at least more than one-half of the phenolic hydroxyls be converted into the corresponding alkanol radicals.

There is no difficulty in making the appropriate calculation on either a laboratory basis or large scale basis. This will be illustrated by reference to a product in which para-tertiary butylphenol and formaldehyde are employed. If a laboratory sample is being employed, then for each gram mole of the phenol, to wit, for each 150 grams employed in producing the resin, one must ultimately employ one gram mole of ethylene oxide (44 grams) to obtain a 1 to 1 ratio. If the resin is prepared, and even if used in the form of a xylene solution representing approximately 200 to 250 grams of dilute solution, in essence, it represents only one phenolic nuceli and the apparent molecular weight equivalent for the resin is 162. This is based on the elimination of two hydrogen atoms in the nucleus and the addition of a methylene radical.

The oxyalkylation-susceptible, water-insoluble, organic solvent-soluble, fusible, phenol-aldehyde resins derived from difunctional phenols used as intermediates to produce the products used in accordance with the invention, are exemplified by Examples 1a through 103a of our Patent 2,499,370, granted March 7, 1950, and reference is made to that patent for examples of the resins used as intermediates.

Previous reference has been made to the use of a single phenol, as herein specified, or a single reactive aldehyde, or a single oxyalkylating agent. Obviously, mixtures of reactants may be employed, as, for example, a mixture of para-butylphenol and para-amylphenol, or a mixture of para-butylphenol and para-hexylphenol, or para-butylphenol and para-phenylphenol. It is extremely difficult to depict the structure of a resin derived from a single phenol. When mixtures of phenols are used, even in equimolar proportions, the structure of the resin is even more indeterminable. In other words, a mixture involving para-butylphenol and para-amylphenol might have an alternation of the two nuclei, or one might have a series of butylated nuclei and then a series of amylated nuclei. If a mixture of aldehydes is employed, for instance, acetaldehyde and butyraldehyde, or acetaldehyde and formaldehyde, or benzaldehyde and acetaldehyde, the final structure of the resin becomes even more complicated and possibly depends upon the relative reactivity of the aldehydes. For that matter, one might be producing simultaneously two different resins, in what would actually be a mechanical mixture, although such mixture might exhibit some unique properties, as compared with a mixture of the same two resins prepared separately. Similarly, as has been suggested, one might use a combination of oxyalkylating agents; for instance, one might partially oxyalkylate with ethylene oxide and then finish off with propylene oxide. It is understood that the oxyalkylated derivatives of such resins, derived from such plurality of reactants, instead of being limited to a single reactant from each of the three classes, is contemplated and here included for the reason that they are obvious variants.

PART 2

Having obtained a suitable resin of the kind described, such resin is subjected to treatment with a low molal reactive alpha-beta olefine oxide, so as to introduce less than 2 alkylene oxide radicals for each phenolic nucleus, and, if desired, an amount of alkylene oxide only sufficient to react, at least statistically, with a majority of the phenolic nuclei per resin molecule. The olefine oxides employed are characterized by the fact that they contain not over 4 carbon atoms and are selected from the class consisting of ethylene oxide, propylene oxide, butylene oxide, glycide and methylglycide. Glycide may be, of course, considered as a hydroxypropylene oxide, and methylglycide as a hydroxybutylene oxide. In any event, however, all such reactants contain the reactive ethylene oxide ring and may best be considered as derivatives of or substituted ethylene oxides. What has been said immediately preceding applies to the alkylene oxide used, both in the initial treatment, i. e., prior to esterification with hydroxyacetic acid, and also in the second treatment, i. e., after such esterification. All this, however, will be illustrated subsequently.

As has been suggested previously, the amount of alkylene oxide, such as ethylene oxide, to add during the initial stage is best determined by the molecular weight of the phenol and aldehyde used to make the resin or by actually making a molecular weight determination of the resin, as described elsewhere. Such molecular weight determination should be made, of course, on a solvent-free resin; for instance, if a resin were made following the procedure of Example 1a of our Patent 2,499,370, and freed from xylene by vacuum distillation, one might have a molecular weight determination showing a value of 800 or thereabouts indicating approximately 5 structural units per molecule. Such resin is then treated with an alkylene oxide so as to convert at least a majority of the phenolic nuclei per resin molecule (in this instance at least 3 out of 5), but in any event, the amount used is less than 2 per phenolic hydroxyl (in this instance 9 or less).

If in an instance like the present illustration the resin molecule had 5 units, and if only 3 or 4 moles of alkylene oxide, such as ethylene oxide, were added per molecule, then one would have a resin, in which, instead of all the units being comparable to the following formula

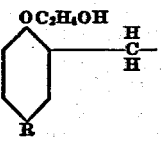

part of the structural units in the resin molecule would correspond to the following:

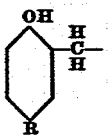

Subsequently, when esterified with hydroxyacetic acid, only the alkanol hydroxyls would react and the phenolic hydroxyls would not. Therefore, that part of the resin molecule having the previously indicated structure, would remain unchanged, whereas, the alcoholic structure would react so that the one would be converted into the following:

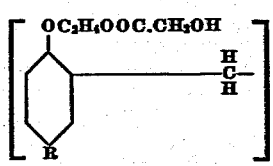

In our co-pending application Serial No. 751,624, filed March 31, 1947, and in the subsequent continuation-in-part, to wit, our co-pending application Serial No. 42,138, filed August 2, 1948, we have pointed out this same type of resin has utility for combination with resinaphore compounds, such as drying oil fatty acids, polycarboxy acids, etc. In such instance, there may be distinct advantage in partial oxyalkylation, i. e., somewhat less than sufficient to convert all phenolic hydroxyls into alcoholic hydroxyls. In the instant application, however, this is not the case, and we consider it advantageous to convert all the phenolic hydroxyls into alkanol hydroxyls, and our preference is to use the alkylene oxide, particularly ethylene oxide, on a mole-for-mole basis calculated back to the amount of phenol used to produce the resin. If any phenolic hydroxyls are not converted into alkanol radicals, and thus are not subsequently esterified with hydroxyacetic acid, it is still obvious, however, that they react in the final oxyalkylation stage to form polyglycol radicals.

Referring to a product such as that of Example 1a of our Patent 2,499,370, it is our preference at the laboratory stage to produce a resin in the manner described and for each gram mole, i. e., 150 grams of para-tertiary butylphenol used to manufacture the resin, we prefer to add one gram mole, i. e., 44 grams, of ethylene oxide in the initial oxyethylation stage. An equivalent molecular amount of the other alkylene oxides can be used. This is substantially the same as using 44 grams of ethylene oxide for each 162 grams of the resin, which is the molecular weight equivalent previously described. Such calculation, of course, is on a solvent-free basis. In larger scale use the same method can be applied, simply substituting pound moles for gram moles.

In the following initial oxyalkylation examples, purely as a matter of convenience, we have used a gram mole of the resin calculated back to a gram mole of the original phenol in each instance. We have also used one gram mole of ethylene oxide. As previously pointed out, somewhat less could be used, or somewhat more, based on the molecular weight of the resin, but in no event would as much as 2 moles be used per phenolic nuclei, i. e., we would always be using less than 88 grams in experiments of this kind. Our preference, however, is the mole-to-mole ratio, as illustrated. The amount of solvent employed may vary, but just as a matter of convenience, we have used an amount of xylene equal to the weight of the resin so as to have a 50% solution. In most instances, the resin samples prepared contained less than 50% xylene, and, therefore, the appropriate amount of xylene was added. Needless, to say, if the resin prepared involved the use of a greater amount of xylene, it can be eliminated by distillation, particularly vacuum distillation.

Since the next stage involves esterification with an acid (methylhydroxy acetate or some other equivalent) we have found it desirable to keep the amount of alkaline catalyst such as caustic soda, caustic potash, or sodium methylate, at a minimum or moderate value. We have used sodium methylate throughout and in these particular experiments have employed 1% of sodium methylate. In many cases, the oxyalkylation, particularly oxyethylation, may be speeded up by using a high speed stirrer and the time required would be even less than the accompanying description and table. The oxyalkylation, particularly oxyethylation, of such resins is for all practical purposes just as described in our co-pending applications Serial Nos. 8,730, 8,731, 8,722 and 8,723, all filed February 16, 1948, as well as our two co-pending applications Serial Nos. 65,080, and 65,082, both filed December 13, 1948, the only difference being, as compared with the data herein reported, is that the amount of alkylene oxide, particularly ethyleneoxide, is invariably less, and in some instances, the amount of solvent present is somewhat higher and the amount of alkylene catalyst may vary slightly.

As previously pointed out, the resins prepared from commercial phenols and aldehydes, or other reagents usually available, vary in color from a white or white-amber to a deep amber, reddish-amber, or almost blackish-red. They may vary from hard solid materials having a melting point in the neighborhood of 150° C. or thereabouts, to viscous fluids at ordinary room temperature. The effect of treatment with an alkylene oxide, particularly mole-for-mole, is only slight, except to the extent that there is a reduction in viscosity, or a change from the solid state to a highly viscous state, or the like. The addition of an alkylene oxide to a resin tends to change the solid to a liquid or a viscous liquid to a thinner liquid.

The following Examples 1b through 9b are included to exemplify the production of initial oxyalkylation products of the invention from resins, specifically resins described in Example 1a through 103a of our Patent 2,499,370, giving exact and complete details for carrying out the procedure. In the table which appears further on in the specification are given data with respect to the oxyethylation of a number of the resins previously described, being understood that in preparing the products referred to in the table, the main procedures used were those in Examples 1b through 9b.

Example 1b

The resin employed is the acid-catalyzed paratertiary butylphenol-formaldehyde resin of Example 1a of Patent 2,499,370. (Such resin can be purchased in the open market.) The resin is powdered and mixed with an equal weight of xylene so as to obtain solution by means of a stirring device employing a reflux condenser. 162 grams of the resin are dissolved in or mixed with 162 grams of xylene. To the mixture there is added 1.6 grams of sodium methylate powder. The solution or suspension is placed in an autoclave, or, for that matter, the mixture is prepared right in the autoclave and 44 grams of ethylene oxide are added. The autoclave is stirred so as to give suitable agitation and heat applied. Usually, the temperature employed will be between 155° and 165° C. and the maximum gauge pressure will usually stay at 150 pounds to 160 pounds per square inch. The minimum gauge pressure towards the end of the reaction is about 20 pounds or less. At the end of the reaction period there is no further drop in pressure, thus indicating that all the ethylene oxide had reacted and the pressure indicated on the gauge represents vapor pressure of xylene at the indicated temperature. In some instances, the reaction can be speeded up, as previously stated, by using a stirrer revolving at comparatively high speed, for instance, 250 to 300 R. P. M., instead of 180 to 200. The reaction is conducted, not necessarily to obtain the optimum speed, but in a manner which will involve no hazard, and preferably, at as low a temperature as feasible. For specific values of maximum temperature, maximum gauge pressure, and time required in a specific experiment illustrating the present example, see tabular data.

Example 2b

The same reactants, and procedure were employed as in Example 1b, preceding, except that propylene oxide was employed instead of ethylene oxide. The resultant, even on the addition of the alkylene oxide in the weight proportions of the previous example, has diminished hydrophile properties, in comparison with the resultants of Example 1b. This illustrates the point that propylene oxide and butylene oxide give products of lower levels of hydrophile properties than does ethylene oxide.

Example 3b

The same reactants and procedure were followed as in Example 1b, except that one mole of glycide was employed initially per hydroxyl radical. This particular reaction was conducted with extreme care and the glycide was added in small amounts representing fractions of a mole. Ethylene oxide was then added, following the procedure of Example 1b, to produce products of greater hydrophile properties. We are extremely hesitant to suggest even the experimental use of glycide and methylglycide, for the reason that diastrous results may be obtained even in experimentation with laboratory quantities.

Example 4b

The same procedure is followed as in Example 1b, except that instead of employing the resin employed in Example 1b, there was substituted instead an equal weight of resin of Example 2a of Patent 2,499,370. The products obtained were similar in appearance, color and viscosity to those of Example 1b.

Example 5b

The same reactants and procedure are employed as in Example 1b, except that the acid catalyzed amylphenol formaldehyde resin of Example 3a of Patent 2,499,370 is used. (Such resin can be purchased in the open market.) Suitable amylphenol resins include those of Examples 4a, 5a and 6a of Patent 2,499,370. The oxyethylated products in color, appearance, viscosity, etc., are like the products of Example 1b.

Example 6b

The same reactants and procedure are employed as in Example 1b, except that the acid-catalyzed octylphenol-formaldehyde resin of Example 8a of Patent 2,499,370 is used instead of the butylphenol resin. As far as we are aware, such resins are not offered for sale in the open market, but may be. The products obtained are very desirable, and in color, appearance, viscosity, etc., resemble the products of Example 1b.

Example 7b

The same reactants and procedure are employed as in Example 1b, except that the acid-catalyzed hydroxydiphenyl (phenylphenol) resin of Example 9a of Patent 2,499,370 is used in place of the butylphenol resin. (Such resin can be purchased in the open market.) The appearance of the oxyethylated products is similar to that of the products of Example 1b, except that the color is distinctly darker. The solubility of the products is less than that of the products of Example 1b and the products do not seem to give quite as good dispersions or solutions.

Example 8b

The same reactants and procedure are employed as in Example 1b, except that the acid-catalyzed cyclohexylphenol resin of Example 10a of Patent 2,499,370 is substituted for the butylphenol resin. Methylcyclohexylphenol resin, used instead of the butylphenol, also gives excellent products. One can manufacture a methylcyclohexylphenol resin following the procedure of Example 10a of Patent 2,499,370. The oxyethylated products of this example are similar in appearance and solubility to the products of Example 1b, but are somewhat more viscous.

Example 9b

The same reactants and procedure were employed as in Example 1b, except that the acid-catalyzed styrylphenol-formaldehyde resin of Example 11a of Patent 2,499,370 was used instead of the butylphenol resin. The oxyethylated products are similar in appearance, color, solubility, etc., to the products of Example 1b.

or it may be a partial or fractional ester. It is advantageous, however, to produce the complete ester by using sufficient hydroxyacetic acid, or the equivalent, to convert all the terminal alkanol radicals present into an ester radical. This applies particularly when ethylene oxide is used. In the event that glycide or methylglycide is used, the number of alkanol radicals or alcoholic hydroxyl radicals at least would be twice as great as the phenolic hydroxyls which have been subjected to alteration. All of this has been made

| Example No. | Example No. of Pat. 2,499,370 of Resin | Molecular Weight Eq. of Resin | Amount of Resin used, grams | Amount of Solvent added, grams | Amount of Na Methylate added, grams | Amount of EtO added, grams | Maximum Temp. °C. during Oxyethl. | Maximum Gauge Pressure lb./sq. in. during Oxyethl. | Time required to complete Oxyethl. (hours) |
|---|---|---|---|---|---|---|---|---|---|
| 1b | 1a | 162 | 162 | 162 | 1.6 | 44 | 140 | 170 | 3 |
| 4b | 2a | 162 | 162 | 162 | 1.6 | 44 | 154 | 126 | 2 |
| 5b | 3a | 176 | 176 | 176 | 1.8 | 44 | 160 | 155 | 2½ |
| 6b | 8a | 218 | 218 | 218 | 2.2 | 44 | 140 | 110 | 4½ |
| 7b | 9a | 182 | 182 | 182 | 1.8 | 44 | 150 | 150 | 2½ |
| 8b | 10a | 188 | 188 | 188 | 1.9 | 44 | 155 | 120 | 4½ |
| 9b | 11a | 210 | 210 | 210 | 2.1 | 44 | 155 | 125 | 5 |
| 10b | 4a | 176 | 176 | 176 | 1.8 | 44 | 130 | 135 | 4 |
| 11b | 5a | 176 | 176 | 176 | 1.8 | 44 | 160 | 105 | 2 |
| 12b | 6a | 175 | 176 | 176 | 1.8 | 44 | 150 | 100 | 2½ |
| 13b | 12a | 176 | 176 | 176 | 1.8 | 44 | 155 | 145 | 3¼ |
| 14b | 13a | 176 | 176 | 176 | 1.8 | 44 | 148 | 148 | 3½ |
| 15b | 14a | 176 | 176 | 176 | 1.8 | 44 | 140 | 125 | 6 |
| 16b | 15a | 176 | 176 | 176 | 1.8 | 44 | 150 | 140 | 6 |
| 17b | 16a | 190 | 190 | 190 | 1.9 | 44 | 156 | 130 | 4½ |
| 18b | 17a | 190 | 190 | 190 | 1.9 | 44 | 140 | 95 | 1 |
| 19b | 19a | 190 | 190 | 190 | 1.9 | 44 | 130 | 140 | 2½ |
| 20b | 20a | 232 | 232 | 232 | 2.3 | 44 | 130 | 130 | 3 |
| 21b | 21a | 196 | 196 | 196 | 2.0 | 44 | 150 | 125 | 3 |
| 22b | 22a | 202 | 202 | 202 | 2.0 | 44 | 135 | 135 | 1 |
| 23b | 23a | 224 | 224 | 224 | 2.2 | 44 | 135 | 145 | 4 |
| 24b | 24a | 260 | 260 | 260 | 2.6 | 44 | 145 | 130 | 3½ |
| 25b | 26a | 260 | 260 | 260 | 2.6 | 44 | 140 | 140 | 1¾ |
| 26b | 27a | 266 | 266 | 266 | 2.7 | 44 | 145 | 133 | ½ |
| 27b | 28a | 272 | 272 | 272 | 2.7 | 44 | 150 | 140 | ¾ |
| 28b | 29a | 252 | 252 | 252 | 2.5 | 44 | 135 | 96 | 2½ |
| 29b | 30a | 238 | 238 | 238 | 2.4 | 44 | 144 | 160 | 4½ |
| 30b | 31a | 238 | 238 | 238 | 2.4 | 44 | 150 | 125 | 1½ |
| 31b | 32a | 258 | 258 | 258 | 2.6 | 44 | 135 | 90 | ¾ |
| 32b | 33a | 264 | 264 | 264 | 2.6 | 44 | 135 | 150 | 5½ |
| 33b | 34a | 204 | 204 | 204 | 2.0 | 44 | 142 | 92 | 4½ |
| 34b | 35a | 190 | 190 | 190 | 1.9 | 44 | 144 | 153 | 3 |
| 35b | 36a | 190 | 190 | 190 | 1.9 | 44 | 125 | 120 | 2 |
| 36b | 37a | 210 | 210 | 210 | 2.1 | 44 | 140 | 130 | ¾ |
| 37b | 38a | 216 | 216 | 216 | 2.2 | 44 | 142 | 120 | 2 |
| 38b | 39a | 272 | 272 | 272 | 2.7 | 44 | 138 | 133 | 5¼ |
| 39b | 40a | 258 | 258 | 258 | 2.6 | 44 | 142 | 132 | 1½ |
| 40b | 41a | 314 | 314 | 314 | 3.1 | 44 | 148 | 140 | 3½ |
| 41b | 42a | 242 | 242 | 242 | 2.4 | 44 | 113 | 107 | 2 |
| 42b | 44a | 221 | 221 | 221 | 2.2 | 44 | 121 | 98 | 2½ |
| 43b | 50a | 162 | 162 | 162 | 1.6 | 44 | 150 | 155 | 3½ |
| 44b | 68a | 176 | 176 | 176 | 1.8 | 44 | 140 | 106 | 3 |
| 45b | 69a | 244 | 244 | 244 | 2.4 | 44 | 140 | 128 | ½ |
| 46b | 85a | 244 | 244 | 244 | 2.4 | 44 | 140 | 130 | 4 |
| 47b | 75a | 258 | 258 | 258 | 2.3 | 44 | 138 | 97 | 4¼ |
| 48b | 77a | 328 | 328 | 328 | 3.3 | 44 | 144 | 133 | 10 |
| 49b | 89a | 310 | 310 | 310 | 3.1 | 44 | 165 | 165 | 1 |
| 50b | 71a | 224 | 224 | 224 | 2.2 | 44 | 130 | 162 | ½ |
| 51b | 70a | 232 | 232 | 232 | 2.3 | 44 | 140 | 100 | ¾ |
| 52b | 86a | 232 | 232 | 232 | 2.3 | 44 | 150 | 95 | 1½ |
| 53b | 87a | 232 | 232 | 232 | 2.3 | 44 | 125 | 130 | 5 |
| 54b | 90a | 232 | 232 | 232 | 2.3 | 44 | 150 | 128 | 4 |
| 55b | 91a | 232 | 232 | 232 | 2.4 | 44 | 140 | 120 | 2¼ |
| 56b | 83a | 328 | 328 | 328 | 3.3 | 44 | 144 | 115 | 2½ |
| 57b | 74a | 232 | 232 | 232 | 2.3 | 44 | 138 | 82 | 1 |
| 58b | 73a | 274 | 274 | 274 | 2.7 | 44 | 152 | 190 | 1¼ |
| 59b | 72a | 246 | 246 | 246 | 2.5 | 44 | 158 | 185 | 3½ |

PART 3

Having obtained the polyhydric alcohol of the kind described in Part 2, immediately preceding, the esterification with hydroxyacetic acid or its equivalent is comparatively simple. Our preference is to use hydroxyacetic acid, and most advantageously from an economic standpoint the 85% commercial product. The remaining 15% in this commercial product is water. Such esterification product forms the acidic ester and water. Needless to say, one can employ any chemical equivalent, such as a low molal ester of hydroxyacetic acid. The methyl ester and ethyl ester may be employed, but for the most part, there is no advantage in doing so.

The ester formed may be the complete ester, clear, either by what has been said previously, or by the subsequent examples.

Example 1c

The polyhydroxy alcohol is the product described in the previous example under heading "Example 1b". Such product, prepared in the manner described, either shows no alkalinity, or at the most, a very slight alkalinity. If methyl or ethyl hydroxyacetate is employed to produce the ester, then and in that event, the catalyst employed is usually a few tenths of a percent, to ½% of an alkaline catalyst, such as soap, lead oleate, etc., in slightly basic material or the like. It has been pointed out previously that there are excellent reasons for preferring to use the commercial hydroxyacetic acid. If the xylene solution of the polyhydric alcohol reactant (Example 1b) shows a slight alkalinity it can be removed in any suitable manner by the addition of the inorganic acid, such as hydrochloric or phosphoric acid, or by the addition of an organic acid, such as acetic acid. The product should be acid to phenolphthalein indicator prior to the addition of hydroxyacetic acid. Of course, if it is still slightly basic, the only thing that will happen is that a more expensive acid, i. e., hydroxyacetic acid, will be wasted. In any event, one adds enough hydroxyacetic acid to convert all the ethanol radicals into ester radicals. In the specific example under description, the product resulting from experiment Example 1b was used in its entirety. This represented 162 grams of the resin, 162 grams of xylene, 1.6 grams of sodium methylate and 44 grams of ethylene oxide, being a total of 370 grams. One mole of hydroxyacetic acid was added to this mixture, made neutral as described by the addition of a very small amount of acetic acid, for each phenolic nucleus originally present. As previously pointed out, under the description of Example 1b, the resin employed in the manufacture of Example 1b is the one described under the heading of Example 1a, of Patent 2,499,370, which, in turn, was obtained from one mole of 150 grams of para-tertiary butylphenol. For this reason, one mole of hydroxyacetic acid (85%) or 90 grams, were added.

This mixture was then placed in a flask under the ordinary reflux condenser with a stirrer and the usual phase-separating trap. The mixture started to reflux at approximately 120°–130° C., and after refluxing action was well started, the trap valve was changed so that, instead of the entire condensate flowing back, only the xylene would be returned, and the water of solution and water of reaction were trapped and discarded. In approximately three to four hours the temperature reached a maximum of 170° to 180° C., and all the water was evolved. The water was discarded and the resultant product represented the complete ester of the polyhydric alcohol described under the heading of Example 1b, preceding.

Example 2c

The same procedure was followed as in Example 1c, except that the resin employed was that described under the heading of Example 4b, which, in turn, was obtained from resin, Example 2a of Patent 2,499,370. The amount of hydroxyacetic acid employed was the same as in the preceding example. In this instance, and in all the remaining instances, the amount of reactants employed is indicated by the total weight of resin and solvent and sodium methylate described in the table illustrating the polyhydric alcohol examples, i. e., the table including Examples 1b to 59b. In each case the amount of acid added was merely a matter of a gram or two, at the most, and can be ignored. However, even if more acid were added, it still would not affect the calculation, for the simple reason that in each instance where a mole of ethylene oxide is used, there must also be used a mole of hydroxyacetic acid, if one is attempting to obtain the complete ester, as is true in the previous instance, the present example, and the next several succeeding examples. If, however, the amount of ethylene oxide employed happened to be more than one mole of ethylene oxide for each phenolic hydroxyl, but in any event less than two moles of ethylene oxide for each phenolic hydroxyl, then the amount of hydroxyacetic acid would have to be based on the phenolic hydroxyl and not on the amount of ethylene oxide added. This can be illustrated by reference to the previous example. One started with one mole of butylphenol and ultimately used one mole of ethylene oxide for each mole of butylphenol. If in that particular example (see Example 1b) one had employed 50% more ethylene oxide, for instance, 66 grams, to combine with the 162 grams of resin, then obviously, if one used an equal amount of hydroxyacetic acid on a molar basis, to wit, 135 grams instead of 90 grams, obviously, hydroxyacetic acid would have been left over or else one would have to form an ester from dimer of hydroxyacetic acid. It is believed this explanation is all that is required, if one prefers to form the ester from a polyhydric alcohol of the kind described in which more ethylene oxide is used than a mole-for-mole basis in terms of the phenolic hydroxyl.

Example 3c

The same procedure was employed as in the two preceding examples, except that the polyhydric alcohol employed was the one described under the heading of Example 5b, which, in turn, was obtained from resin, Example 3a of Patent 2,499,370. In this instance, the amount of resin used initially was greater, to wit, 176 grams, and likewise, the amount of solvent employed, to wit, 176 grams, but since the polyhydric alcohol reactant was obtained by the same amount of ethylene oxide, to wit, one gram mole (44 grams), the same amount of hydroxyacetic acid was added as in previous examples, to wit, 90 grams of the 85% material. The ester was produced in the same way.

Example 4c

The same procedure was followed as in the three preceding examples, except that the polyhydric alcohol reactant employed was that of Example 6b, which, in turn, was obtained from resin, Example 8a of Patent 2,499,370. Note the increased resin weight, i. e., 218 grams.

Example 5c

The same procedure was followed as in the four preceding examples, except that the polyhydric alcohol reactant employed was that of Example 7b, which, in turn, was obtained from resin, Example 9a of Patent 2,499,370. The procedure, in all respects, was the same as previously used, to wit, employing 90 grams of the 85% acetic acid.

Example 6c

The procedure was the same as in the previous examples, except that the polyhydric alcohol reactant employed was the one described under the heading of Example 45b, which, in turn, was obtained from resin, Example 69a of Patent 2,499,370. Note the weight of the resin was 244 grams.

Example 7c

The procedure was the same as in the previous examples, except that the polyhydric alcohol reactant employed was the one described under Example 51b, which, in turn, was obtained from resin, Example 70a of Patent 2,499,370. Note the weight of the resin was 232 grams. The amount of hydroxyacetic acid employed was the same as previously.

Example 8c

The polyhydric alcohol reactant employed was the one described under the heading of Example 50b, which, in turn, was obtained from resin, Example 71a of Patent 2,499,370. Note that the weight of the resin was 224 grams. The amount of hydroxyacetic acid employed was the same as before.

Example 9c

The polyhydric alcohol reactant employed was the one described under the heading of Example 59b, which, in turn, was obtained from resin, Example 72a of Patent 2,499,370. Note the weight of the resin was 246 grams.

Example 10c

The same procedure was employed as in the preceding nine examples, except that the amount of hydroxyacetic acid employed was approximately three-fourths the amount described in the preceding examples, to wit, 67.5 grams. This meant that on the average three of the ethanol radicals out of four were converted into hydroxyacetic acid radicals and the fourth was unchanged. This simply illustrates the formation of a partial or fractional ester instead of a complete ester. Needless to say, the residual alkanol radical is reactive towards ethylene oxide. The esterification process is the same as in the preceding example, although the time required is a little less, insofar that water of reaction and water of solution are somewhat smaller in amount.

Referring back to the table illustrating Examples 1b to 59b, it will be noted that one mole of ethylene oxide was used in each instance for each phenolic hydroxyl. If a smaller amount had been used, for instance, 33 grams of ethylene oxide instead of 44, and assuming that the average resin molecule had 4 to 5 units, it is obvious that there would have been one residual phenolic hydroxyl which would have been unconverted, assuming statistical distribution. If such resin were treated with hydroxyacetic acid, one could, of course, use mole for mole and not exceed the previously stated upper limit, but if one used a lesser amount, for instance, mole for mole, on the basis of the alkylene oxide (ethylene oxide employed) then the use of 67.5 grams of 85% hydroxyacetic acid would have been just sufficient to combine with all the ethanol radicals and the remaining hydroxy radical would have been a phenolic hydroxyl radical and not an ethanol radical. Such phenolic hydroxyl radical, of course, would be just as susceptible to oxyalkylation in the succeeding step and would not interfere in any manner whatsoever.

PART 4

What has been said in the previous parts is simply a description whereby one can produce a fusible, water-insoluble, organic solvent-soluble resin, substantially devoid of significant hydrophile properties, at least not sufficiently hydrophile to meet the requirements of the final oxyalkylated derivatives, as described in the next succeeding part. For purpose of convenience, it may be well to re-summarize the nature of this resinous material which is subsequently subjected to oxyalkylation, as described in the instant section.

Difunctional phenols and aldehydes produce resins of the kind which may be represented in idealized form by the following formula, as previously stated, and in which the characters have their prior significance:

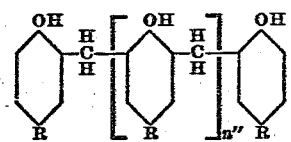

In the present instance one is concerned with the oxyalkylation, particularly the oxyethylation, of a resin, which, in one of its more important aspects, may be characterized by the previous formula, which is as follows:

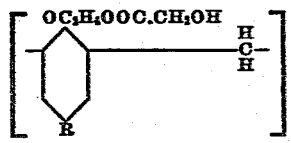

However, although the resin molecule subsequently subjected to oxyethylation is admirably illustrated by the aforementioned idealized structure, yet it has been pointed out that there may be present in the resin molecule either one of two structures which do not necessarily contain the hydroxyacetic acid radical. Such structures are the following two:

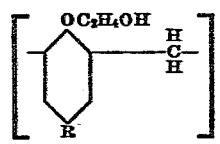

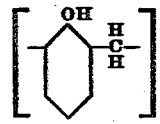

However, it has been pointed out also that the amount of ethylene oxide, or other alkylene oxide employed, may be more than mole-for-mole, based on the original phenolic hydroxyl, but must be less than two moles for one, and regardless of the amount of alkylene oxide employed in the final product, i. e., the ester (total or partial) must meet the requirements in regard to lack of hydrophile properties, as previously stated and hereinafter specified in greater detail in respect to the final oxyalkylated product. Thus, not only might the previous structures appear in the resin, but other structures, which may be illustrated by the following:

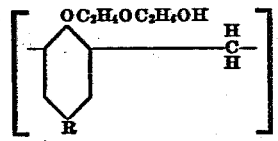

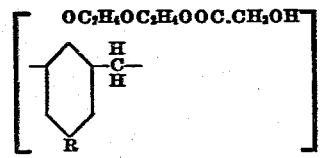

Needless to say, the complexity of the various structures increases when the alkylene oxide happens to be of the type exemplified by glycide or methylglycide. However, for purpose of brevity, further elaboration is being avoided and it is believed it is unnecessary, in light of the very comprehensive description preceding, and which appears hereafter.

Referring now to hydroxyacetic acid ester resins which are subjected to oxyalkylation, particularly oxyethylation, to give synthetic compounds having at least minimum hydrophile properties, as hereinafter described, it is to be noted that the procedure is substantially the same as in the oxyalkylation, particularly oxyethylation, of resins obtained exclusively from difunctional phenols, and aldehydes, as described in our aforementioned co-pending applications Serial Nos. 8,730 and 8,731, both filed February 16, 1948. The original resins, as prepared in the examples indicated by Example 1a, etc., of Patent 2,499,370, vary, as previously stated, from hard resins to viscous fluids. They vary in color from almost water-white to pale amber, amber, deep amber, or a reddish-black. The initial step of oxyalkylation reduces the state of the resin to a less viscous state, i. e., from a hard melting solid to a tacky solid, from a tacky solid to a viscous liquid, from a viscous liquid to a thinner liquid, etc. A comparatively small amount of alkylene oxide added in the conversion into the polyhydric alcohol stage does not materially affect color. Similarly, esterification with hydroxyacetic acid seems to have substantially the same effect as far as physical appearance goes, to wit in the direction of greater fluidity; and in event, in the direction going from a solid to a liquid. There is not much change in color, although the tendency is to lighten the product. Thus, the esters subjected to the final oxyalkylation may vary from hard or sticky solids, or in some instances to highly viscous fluids, sometimes pitch-like in character, to fluids of viscosity resembling castor oil, or even less, and sometimes comparatively thin fluids. Needless to say, when diluted with xylene or any other selected solvent, they show no appreciable viscosity at all.

Oxyalkylation is conducted in the presence of an alkaline catalyst. We have pointed out that in the composition of the esterification reaction, asssuming that all the hydroxyacetic acid has been used up, the resulting product is either neutral or almost neutral. The latter would be particularly the case if a small amount of an organic catalyst, such as toluene sulfonic acid, had been added to the extent of about two-tenths of 1%, or ½%, to speed up the reaction. In any event, enough alkali, preferably a 25% caustic soda solution, is added to make the product at least neutral to methyl orange indicator. At this particular point the ester with a solvent present, or with the bulk of the solvent removed by distillation or vacuum distillation to 150° to 180° C. is placed in an autoclave mixed with 1% to 2% of sodium methylate, based on the weight of the ester and subjected to oxyalkylation, particularly oxyethylation. Other alkaline catalysts can be used instead of sodium methylate, such as caustic soda, caustic potash, sodium oleate, etc.

Briefly, then, having obtained a suitable hydroxyacetic acid ester resin of the kind described, it is subjected to treatment with a low molal reactive alpha-beta olefine oxide, so as to render the product distinctly hydrophile in nature, as indicated by that fact that it becomes self-emulsifiable or miscible or soluble in water, or self-dispersible, or has emulsifying properties. The olefine oxides employed are characterized by the fact that they contain not over 4 carbon atoms and are selected from the class consisting of ethylene oxide, propylene oxide, butylene oxide, glycide, and methylglycide. Glycide may be, of course, considered as a hydroxypropylene oxide and methyl glycide as a hydroxybutylene oxide. In any event, however, all such reactants contain the reactive ethylene oxide ring and may be best considered as derivatives of or substituted ethylene oxides. The solubilizing effect of the oxide is directly proportional to the percentage of oxygen present, or specifically, to the oxygen-carbon ratio.

In ethylene oxide, the oxygen-carbon ratio is 1:2. In glycide, it is 2:3; and in methyl glycide, 1:2. In such compounds, the ratio is very favorable to the production of hydrophile or surface-active properties. However, the ratio, in propylene oxide, is 1:3, and in butylene oxide, 1:4. Obviously, such latter two reactants are satisfactorily employed only where the resin composition is such as to make incorporation of the desired property practical. In other cases, they may produce marginally satisfactory derivatives, or even unsatisfactory derivatives. They are usable in conjunction with the three more favorable alkylene oxides in all cases. For instance, after one or several propylene oxide or butylene oxide molecules have been attached to the resin molecule, oxyalkylation may be satisfactorily continued, using the more favorable members of the class, to produce the desired hydrophile product. Used alone, these two reagents may, in some cases, fail to produce sufficiently hydrophile derivatives because of their relatively low oxygen-carbon ratios.

Thus, ethylene oxide is much more effective than propylene oxide, and propylene oxide is more effective than butylene oxide. Hydroxypropylene oxide (glycide) is more effective than propylene oxide. Similarly, hydroxybutylene oxide (methyl glycide) is more effective than butylene oxide. Since ethylene oxide is the cheapest alkylene oxide available and is reactive, its use is definitely advantageous, and especially in light of its high oxygen content. Propylene oxide is less reactive than ethylene oxide, and butylene oxide is definitely less reactive than proylene oxide. On the other hand, glycide may react with almost explosive violence and must be handled with extreme care.

The oxyalkylation of resins of the kind from which the products used in the practice of the present invention are prepared is advantageously catalyzed by the presence of an alkali. Useful alkaline catalysts, include soaps, sodium acetate, sodium hydroxide, sodium methylate, caustic potash, etc. The amount of alkaline catalyst usually is between 0.2% to 2%. The temperature employed may vary from roof temperature to as high as 200° C. The reaction may be conducted with or without pressure, i. e., from zero pressure to approximately 200, or even 300, pounds gauge pressure (pounds per square inch). In a general way, the method employed is substantially the same procedure as used for oxyalkylation of other organic materials having reactive phenolic groups.

It is advantageous to conduct the oxyethylation in presence of an inert solvent, such as xylene, cymene, decalin, ethylene glycol diethylether, diethyleneglycol diethylether, or the like, although with many resins, the oxyalkylation proceeds satisfactorily without a solvent.

If a xylene solution is used in an autoclave, as hereinafter indicated, the pressure readings, of course, represent total pressure, i. e., the combined pressure, due to xylene and also due to ethylene oxide, or whatever other oxyalkylating agent is used. Under such circumstances, it may be necessary at times to use substantial pressures to obtain effective results, for instance, pressures up to 300 pounds along with correspondingly high temperatures, if required.

As previously stated, by and large the esters herein employed as the intermediate which is subjected to the final oxyalkylation stage, are apt to be liquids or pitch-like solids, but in any event, are apt to be liquid at the temperature of oxyalkylation. Therefore, it is not usual that a solvent must be present, or must conveniently be present, as happens to be the case where one is oxyalkylating a high melting resin which might not even be particularly fluid at the temperature of oxyalkylation. Purely as a matter of convenience, we prefer to permit the solvent used, such as xylene, to be present during oxyalkylation, and if desired, could remove it after the oxyalkylation step. However, such solvent is not objectionable, for numerous uses, such as demulsification, and therefore, is merely a matter of convenience. It is pointed out, however, that the solvent-free hydroxy-acetic acid ester resin may be employed, or after oxyalkylation, the solvent may be removed.

Another suitable procedure is to use propylene oxide or butylene oxide as a solvent as well as a reactant in the earlier stages along with ethylene oxide, for instance, by dissolving the powdered resin in propylene oxide, even though oxyalkylation is taking place to a greater or lesser degree. After a solution has been obtained which represents the original resin dissolved in propylene oxide or butylene oxide, or a mixture which includes the oxyalkylated product, ethylene oxide is added to react with the liquid mass until hydrophile properties are obtained. Since ethylene oxide is more reactive than propylene oxide or butylene oxide, the final product may contain some unreacted propylene oxide or butylene oxide which can be eliminated by volatilization or distillation in any suitable manner.

Attention is directed to the fact that the resins herein described must be fusible or soluble in an organic solvent. Fusible resins invariably are soluble in one or more organic solvents, such as those mentioned elsewhere herein. It is to be emphasized, however, that the organic solvent employed to indicate or assure that the resin meets this requirement need not be the one used in oxyalkylation. Indeed, solvents, which are susceptible to oxyalkylation, are included in this group of organic solvents. Examples of such solvents are alcohols and alcohol-ethers. The fact that the resin is soluble in an organic solvent, or the fact that it is fusible, means that it consists of separate molecules. Phenol-aldehyde hydroxyacetic acid ester resins of the type specified herein possess reactive hydroxyl groups and are oxyalkylation-susceptible, although we are aware that esters are susceptible to oxyalkylation and that esters contain secondary alcohol radicals, such as triricinolein; or do not appear to be susceptible at this particular point of reactivity, yet from what we have been able to determine, we believe that in the case of the instant resins, that point of reactivity is the primary alcoholic radical of the hydroxyacetic acid residue.

Considerable of what is said immediately hereinafter is concerned with the ability to vary the hydrophile properties of the reactants used, from minimum hydrophile properties to maximum hydrophile properties.

Recapitulating what has been said, prior to the final oxyalkylation step, i. e., in the preparation of the phenol-aldehyde hydroxyacetic acid ester, it is to be noted that the following prevails:

(1) The resin molecule, as such, contained a minimum of at least three phenolic nuclei.

(2) The amount of alkylene oxide added, such as ethylene oxide, was at least sufficient to convert a majority of the phenolic hydroxyl radicals into alkanol radicals, in turn converted into hydroxyacetic acid radicals, and thus, as a corollary in the case of the minimum size resin with minimum alkanol conversion, i. e., a 3-unit resin with 2 phenols converted into alkanol radicals, one would have to convert both alkanol radicals into hydroxyacetic acid radicals, in order to meet prerequisite conversion.

(3) Regardless of whether conversion and esterification are at the minimum point, or at the maximum point, that is where $2n-1$ mole of alkylene oxide have been added to a resin molecule having $n$ number of phenolic nuclei, even so, the resultant product, prior to the final oxyalkylation step, is (a) water-insoluble, (b) solvent-soluble, (c) devoid of hydrophile sub-surface-active or surface-active properties, as hereinafter described in reference to the final derivative.

Even more remarkable and equally difficult to explain, are the versatility and utility of these compounds as one goes from minimum hydrophile property to ultimate maximum hydrophile property. For instance, minimum hydrophile property may be described roughly as the point where two ethyleneoxy radicals or moderately in excess thereof are introduced, whether at phenolic, alkanol or the primary terminal hydroxyl of a hydroxyacetic acid radical. Such minimum hydrophile property or sub-surface-activity or minimum surface-activity means that the product shows at least emulsifying properties or self-dispersion in cold or even in warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if, one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol as described immediately preceding, then, and in that event, hydrophile properties are indicated by the fact that one can produce an emulsion by having present 10% to 50% of an insert solvent such as xylene. All that one need to do is to have a xylene solution within the range of 50 to 90 parts, by weight, of oxyalkylated derivatives and 50 to 10 parts, by weight, of xylene and mix such solution with one, two or three times its volume of distilled water and shake vigorously so as to obtain an emulsion which may be of the oil-in-water type or the water-in-oil type (usually the former), but, in any event, is due to the hydrophile-hydrophobe balance of the oxyalkylated derivative. We prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water-soluble, it may be dissolved in ethyl or methyl alcohol, ethylene glycol diethylether, or diethylene glycol diethylether, with a little acetone added, if required, making a rather concentrated solution, for instance, 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.) Needless to say, a test can be made in presence of an insoluble solvent such as 5% to 15% of xylene, as noted in previous examp'es. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein contemplated compounds for use as reactants, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50–50 solution is then mixed with 1–3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the reactants used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per phenolic nucleus, for producing products useful for the practice of this invention. Another variation is the molecular size of the resin chain resulting from reaction between the difunctional phenol and the aldehyde, such as formaldehyde. It is well known that the size and nature or structure of the resin polymer obtained varies somewhat with the conditions of reaction, the proportions of reactants, the nature of the catalyst, etc.

Based on molecular weight determinations, most of the resins prepared as herein described, and used as raw materials for the preparation of more elaborate derivatives, particularly in the absence of a secondary heating step, contain 3 to 6 or 7 phenolic nuclei with approximately 4½ or 5½ nuclei as an average. More drastic conditions of resinification yield resins of greater chain length. Such more intensive resinification is a conventional procedure and may be employed if desired. Molecular weight, of course, is measured by any suitable procedure, particularly by cryoscopic methods; but using the same reactants and using more drastic conditions of resinification, one usually finds that higher molecular weights are indicated by higher melting points of the resins and a tendency to decreased solubility. See what has been said elsewhere herein in regard to a secondary step involving the heating of a resin with or without the use of vacuum.

We have previously pointed out that either an alkaline or acid catalyst is advantageously used in preparing the resin. A combination of catalysts is sometimes used in two stages; for instance, an alkaline catalyst is sometimes employed in a first stage, followed by neutralization and addition of a small amount of acid catalyst in a second stage. It is generally believed that even in the presence of an alkaline catalyst, the number of moles of aldehyde, such as formaldehyde, must be greater than the moles of phenol employed, in order to introduce methylol groups in the intermediate stage. There is no indication that such groups appear in the final resin, if prepared by the use of an acid catalyst. It is possible that such groups may appear in the finished resins prepared solely with an alkaline catalyst; but we have never been able to confirm this fact in an examination of a large number of resins prepared by ourselves. Our preference, however, is to use an acid-catalyzed resin, particularly employing a formaldehyde-to-phenol ratio of 0.95 to 1.20, and, as far as we have been able to determine, such resins are free from methylol groups. As a matter of fact, it is probable that in acid-catalyzed resinification, the methylol structure may appear only momentarily at the very beginning of the reaction, and in all probability, is converted at once into a more complex structure during the intermediate stage.

The procedure used in the second oxyalkylation step is, of course, the same procedure as was used in the first step, as exemplified by Examples 1b, and following examples. However, in that particular case, the amount of alkylene oxide added was at a minimum, the purpose being only to convert the majority of all phenolic hydroxyls into alkanol hydroxyls, and to avoid introducing hydrophile character of the kind previously specified as being a necessary prerequisite of a final derivative. In the last and final step of oxyalkylation one was no longer interested in introducing alkanol groups for reaction with hydroxyacetic acid, but is, in fact, concerned with the introduction of hydrophile properties, so as to make the final derivative hydrophile, sub-surface-active, or surface-active, as defined. Therefore, the amount of alkylene oxide introduced is much larger, the time required is usually longer, and a wide variety of derivatives are obtainable. Finally, during this extended period of reaction, cross-linking may take place for a variety of reasons, some of which have been referred to and others of which were obvious, in light of what has been said herein. With this in mind, the subsequent examples illustrating this final stage of oxyalkylation will be included, although it may not be necessarily required.

Attention is directed to the fact that in the subsequent examples reference is made to the step-wise addition of the alkylene oxide, such as ethylene oxide. It is understood, of course, that there is no objection to the continuous addition of alkylene oxide until the desired stage of reaction is reacted. In fact, there may be less of a hazard involved, and it is often advantageous to add the alkylene oxide slowly in a continuous stream and in such amount as to avoid exceeding the higher pressures noted in the various examples or elsewhere.

What has been said previously is not intended to suggest that any experimentation is necessary to determine the degree of oxyalkylation, and particularly oxyethylation. What has been said previously is submitted primarily to emphasize the fact that these remarkable oxyalkylated resins, having surface-activity, show unusual properties as the hydrophile character varies from a minimum to an ultimate maximum. One should not underestimate the utility of any of these products in a surface-active or sub-surface-active range without testing them for the purpose in mind, such as demulsification. A few simple laboratory tests which can be conducted in a routine manner will usually give all the information that is required.

For instance, a simple rule to follow is to prepare a hydroxyacetic acid-esterified alkylene oxide-modified resin having at least three phenolic nuclei and being organic solvent-soluble. Oxyethylate such resin, using the following four ratios of total moles of ethylene oxide per phenolic unit equivalent: 2 to 1; 6 to 1; 10 to 1; and 15 to 1. From a sample of each product remove any solvent that may be present, such as xylene.

Prepare 0.5% and 5.0% solutions in distilled water, as previously indicated. A mere examination of such series will generally reveal an approximate range of minimum hydrophile character, moderate hydrophile character, and maximum hydrophile character. If the 2 to 1 ratio does not show minimum hydrophile character by test of the solvent-free product, then one should test its capacity to form an emulsion, when admixed with xylene or other insoluble solvent. If neither test shows the required minimum hydrophile property, repetition using 2½ to 4 moles per phenolic nucleus will serve. Moderate hydrophile character should be shown by either the 6 to 1 or 10 to 1 ratio. Such moderate hydrophile character is indicated by the fact that the sol in distilled water within the previously mentioned concentration range is a permanent translucent sol, when viewed in a comparatively thin layer, for instance, the depth of a test tube. Ultimate hydrophile character is usually shown at the 15 to 1 ratio test, in that adding a small amount of an insoluble solvent, for instance, 5% of xylene, yields a product which will give, at least temporarily, a transparent or translucent sol of the kind just described. The formation of a permanent foam, when a 0.5% to 5.0% aqueous solution is shaken, is an excellent test for surface activity. Previous reference has been made to the fact that other oxyalkylating agents may require the use of increased amounts of alkylene oxide. However, if one does not even care to go to the trouble of calculating molecular weights, one can simply arbitrarily prepare compounds containing ethylene oxide equivalent to about 50% to 75%, by weight, for example, 65%, by weight, of the resin to be oxyethylated; a second example using approximately 200% to 300%, by weight, and a third example, using about 500% to 750%, by weight, to explore the range of hydrophile-hydrophobe balance.

A practical examination of the factor of oxyalkylation level can be made by a very simple test, using a pilot plant autoclave having a capacity of about 10 to 15 gallons, as hereinafter described. Such laboratory-prepared routine compounds can then be tested for solubility, and, generally speaking, this is all that is required to give a suitable variety covering the hydrophile-hydrophobe range. All these tests, as stated, are intended to be routine tests and nothing more. They are intended to teach a person, even though unskilled in oxyethylation or oxyalkylation, how to prepare, in a perfectly arbitrary manner, a series of compounds illustrating the hydrophile-hydrophobe range.

If one purchases a thermoplastic or fusible resin on the open market selected from a suitable number which are available, one might have to make certain determinations, in order to make the quickest approach to the appropriate oxyalkylation range. For instance, one should know (a) the molecular size, indicating the number of phenolic units; (b) the nature of the aldehydic residue, which is usually $CH_2$; and (c) the nature of the substituent, which is usually butyl, amyl, or phenyl.

Knowing the approximate molecular weight properties of the resin, whether purchased in the open market or prepared, and making the appropriate calculations for the addition of the alkylene oxide, such as ethylene oxide, followed by esterification with hydroxyacetic acid, as specified, one can readily calculate the approximate molecular weight or the acetyl or hydroxyl number per resin molecule, or per original gram mole or pound mole of phenol employed. With such information one is in a position to add the alkylene oxide, such as ethylene oxide, based on either exact molar ratios or approximate molar ratios, which are more than satisfactory for the purpose involved.

Using such an approximate weight, one need only introduce, for example, one molal weight of ethylene oxide, or slightly more, perhaps at times two moles of ethylene oxide, or slightly more, to produce minimum hydrophile character. In calculating the amount of alkylene oxide required to produce minimum hydrophile character, it is our experience that one can include all the alkylene oxide added, to wit, the amount added prior to the esterification step, and that added after the esterification step. Usually, two moles of ethylene oxide or slightly more on this total basis are sufficient to yield a product of minimal hydrophile character. Further oxyalkylation gives enhanced hydrophile character. Although we have prepared and tested a number of oxyethylated derivatives of the kind described herein, we have found no instance where the use of less than two moles of ethylene oxide per original phenolic nuclei, including the oxide added before and after esterification, gave desirable properties.

*Example 1d*

The product, subsequent to oxyalkylation, and more specifically oxyethylation, is the esterified polyhydroxy alcohol obtained as described under the heading of Example 1c. Esterified Example 1c was obtained, in turn, from polyhydroxy Example 1b, which, in turn, was obtained from resin, Example 1a of our Patent 2,499,370. In recapitulation, 162 grams of the original resin with solvent were treated with 44 grams of ethylene oxide, and subsequently, with 76 grams (anhydrous basis) of hydroxyacetic acid to yield 264 grams of the esterified resin. This amount of the product, equivalent for practical purposes, to a gram mole, together with part of the solvent used in the prior process, particularly during esterification, was mixed with an alkaline catalyst and subjected to oxyethylation. Before adding the alkaline catalyst, however, the solution of the esterified resin is checked for acidity or alkalinity. If desired, enough concentrated caustic soda or caustic potash should be added (25% or 30% solution) to make a resin solution at least alkaline to methyl orange indicator, and if desired, a little more alkali may be added so as to bring the "neutral point" closer to showing alkalinity to phenolphthalein indicator. If such precaution is not taken, particularly where an organic sulfonic acid has been used as a catalyst, some of the sodium methylate subsequently employed will be wasted and oxyalkylation will proceed at a slow rate. Incidentally, oxyalkylation can be speeded up by using considerably more sodium methylate than shown in the subsequent table, i. e., instead of using 1.33 sodium methylate, one may use 50% more, i. e., 2% sodium methylate.

In actual experimentation we have permitted part of the xylene used during esterification to distill out and be removed by the phase-separating trap arrangement previously referred to. As previously pointed out, if desired, all the solvent could be removed by distillation, including vacuum distillation, or more solvent could be added. As a matter of convenience, we have employed 264 grams of the resin as previously noted, and 136 grams of solvent, making the total weight of the mixture 400 grams. To this we added 1½% of sodium methylate, based on the solvent-free ester. This amounted to 3.5 grams of sodium methylate. Any of the other alkaline catalysts previously described could be used. This mixture of esterified resin, solvent, and sodium methylate was placed in a conventional autoclave of the kind previously described in Examples 1b and following. The amount of ethylene oxide added at this stage was an amount approximately equal in weight to the weight of the esterified resin, being a total of about 260 grams in four additions of 65 grams each. The time required to add each batch of ethylene oxide varied from about 2½ to 4 hours, the temperature from about 155° to 180° C. and the pressure from approximately 125 to 165. Specific details in regard to each addition are given in the table which follows immediately after the description of Example 12d.

As previously noted, during such addition, varying from 2½ to 4 hours, the point is reached where there is no further drop in pressure, thus indicating that all the ethylene oxide present has reacted and the pressure registered on the gauge represents the vapor pressure of xylene at indicated temperature. The table indicates the change in solubility as oxyethylation progresses.

If one speeds up the stirring device from a normal speed of approximately 180 to 200 R. P. M., to approximately 250 to 280 or thereabouts, the reaction takes place more rapidly. This is true also if more catalyst is added. We prefer to keep the catalyst at not more than 2% at the most.

In one such operation the resultant, when cold, was a viscous, opaque liquid, readily emulsifiable in water, even in the presence of the added xylene. This indicates that the incipient emulsification, in absence of xylene, probably appeared at the completion of the second, or in any event, the third, addition of ethylene oxide. In other words, the addition of about 110 to 165 grams of ethylene oxide is sufficient to give significant hydrophile properties, in the absence of xylene, and even noticeable hydrophile properties in the presence of xylene. Note, however, that there had been added previously a gram mole (44 grams) of ethylene oxide prior to the esterification stage. The initial hydrophile point approximates total ethylene oxide (both first stage addition and final second-stage addition) equal to or perhaps slightly less than 100% weight of the original unesterified resin, i. e., the phenol-aldehyde resin, as described in Example 1a of Patent 2,499,370 and subsequent examples. In this instance, in order to obtain greater solubility, the amount of ethylene oxide used for reaction was increased by a second series of additions, using substantially the same conditions of reaction, as previously noted. Such series was continued until, as an upper limit, approximately 700 grams of ethylene oxide had been introduced, that is, an amount which was almost three times the weight of the esterified resin and almost four times the weight of the original phenol-aldehyde resin described under the heading of Example 1a of Patent 2,499,370. See the attached table for data in which the ratio of alkylene oxide, as added, is sufficient to give excellent solubility and to yield compounds which are distinctly valuable for numerous purposes and particularly for demulsification. The compound, as prepared, as above indicated, was light amber in color, miscible in water and had a viscosity somewhat less than that of castor oil.

*Example 2d*

The same reactants and procedure were employed as in Example 1d, preceding, except that propylene oxide was employed instead of ethylene oxide. The resultant, even on the addition of the alkylene oxide in the weight proportions of the previous example, has diminished hydrophile properties, in comparison with the resultants of Example 1d. This illustrates the point that propylene oxide and butylene oxide give products of lower levels of hydrophile properties than does ethylene oxide.

*Example 3d*

The same reactants and procedures were followed as in Example 1d, except that one mole of glycide was employed initially per hydroxyl radical. This particular reaction was conducted with extreme care and the glycide was added in small amounts representing fractions of a mole. Ethylene oxide was then added, following the procedure of Example 1d, to produce products of greater hydrophile properties. We are extremely hesitant to suggest even the experimental use of glycide and methylglycide, for the reason that disastrous results may be obtained even in experimentation with laboratory quantities.

*Example 4d*

The same procedure was followed as in Example 1d, except that instead of employing the esterified resin employed in Example 1d, there was substituted instead 264 grams of resin in Example 2c. The product obtained was similar in appearance, color and viscosity to that of Example 1d.

*Example 5d*

The same procedure was followed as in Example 1d, except that instead of employing the esterified resin employed in Example 1d, there was substituted instead 278 grams of resin of Example 3c. The product obtained was similar in appearance, color and viscosity to that of Example 1d.

*Example 6d*

The same procedure was followed as in Example 1d, except that instead of employing the esterified resin employed in Example 1d, there was substituted instead 320 grams of resin of Example 4c. The product obtained was similar in appearance, color and viscosity to that of Example 1d.

*Example 7d*

The same procedure was followed as in Example 1d, except that instead of employing the esterified resin employed in Example 1d, there was substituted instead 284 grams of resin of Example 5c. The product obtained was similar in appearance, color and viscosity to that of Example 1d.

*Example 8d*

The same procedure was followed as in Example 1d, except that instead of employing the esterified resin employed in Example 1d, there was substituted instead 346 grams of resin of Example 6c. The product obtained was similar in appearance, color and viscosity to that of Example 1d.

*Example 9d*

The same procedure was followed as in Example 1d, except that instead of employing the esterified resin employed in Example 1d, there was substituted instead 334 grams of resin of Example 7c. The product obtained was similar in appearance, color and viscosity to that of Example 1d.

Example 10d

The same procedure was followed as in Example 1d, except that instead of employing the esterified resin employed in Example 1d, there was substituted instead 326 grams of resin of Example 8c. The product obtained was similar in appearance, color and viscosity to that of Example 1d.

Example 11d

The same procedure was followed as in Example 1d, except that instead of employing the esterified resin employed in Example 1d, there was substituted instead 348 grams of resin of Example 9c. The product obtained was similar in appearance, color and viscosity to that of Example 1d.

Example 12d

The same procedure was followed as in Example 1d, preceding, except that the esterified resin subjected to oxyethylation was a partial ester and not a total ester. It was produced by using 57 grams of anhydrous hydroxyacetic acid, instead of 76 grams. This meant that the product subjected to oxyethylation in the final stage was a partial ester and not a complete ester. However, the remaining alkanol radical, assuming approximately 4 units per resin molecule, is, of course, as susceptible to oxyethylation as the hydroxyacetic acid radical. For this reason, no change was made in the amount of ethylene oxide added, but the amount of esterified resin employed was slightly less than in Example 1d, being 250 grams in the instant experiment.

| Example No. Final Derivative | From Ester Ex. No. | Derived in turn from Ex. No. | Derived From Resin Ex. No. of Patent 2,499,370 | Weight of Ester Resin (grams) | Weight of Solvent (xylene) (grams) | Weight of Na Methylate (grams) |
|---|---|---|---|---|---|---|
| 1d | 1c | 1b | 1a | 264 | 136 | 3.5 |
| 4d | 2c | 4b | 2a | 264 | 136 | 3.5 |
| 5d | 3c | 5b | 3a | 278 | 122 | 3.7 |
| 6d | 4c | 6b | 8a | 320 | 130 | 4.3 |
| 7d | 7c | 7b | 9a | 284 | 116 | 3.8 |
| 8d | 6c | 45b | 69a | 346 | 154 | 4.6 |
| 9d | 7c | 51b | 70a | 334 | 166 | 4.5 |
| 10d | 8c | 50b | 71a | 326 | 174 | 4.4 |
| 11d | 9c | 59b | 72a | 348 | 152 | 4.8 |
| 12d | 1c[1] | 16 | 1a | 250 | 150 | 3.3 |

[1] Modification as described under heading 12d.

First addition

| Example No. Final Derivative | Amount of EtO added, (grams) | Max. Temp. °C. during Oxyeth. | Maximum Gauge Press. lb./sq. in. during Oxyeth. | Time required to complete Oxyeth., (hours) | Solubility [1] |
|---|---|---|---|---|---|
| 1d | 65 | 140 | 158 | 5½ | A. |
| 4d | 65 | 155 | 154 | 4¾ | A. |
| 5d | 70 | 145 | 130 | 4½ | A. |
| 6d | 80 | 135 | 112 | 4¾ | A. |
| 7d | 75 | 155 | 152 | 3 | A. |
| 8d | 85 | 142 | 125 | 6 | A. |
| 9d | 85 | 140 | 100 | 1¼ | A. |
| 10d | 80 | 138 | 110 | 2¾ | A. |
| 11d | 90 | 135 | 168 | ¾ | A. |
| 12d | 65 | 142 | 152 | 4¾ | A. |

[1] See end of table showing solubility characteristics indicated by letters A, B, C, etc.

Second addition

| Example No. Final Derivative | Amount of EtO added, (grams) | Max. Temp. °C. during Oxyeth. | Maximum Gauge Press. lb./sq. in. during Oxyeth. | Time required to complete Oxyeth., (hours) | Solubility [1] |
|---|---|---|---|---|---|
| 1d | 65 | 160 | 140 | 4¾ | A to B. |
| 4d | 65 | 162 | 144 | 5 | A to B. |
| 5d | 70 | 148 | 132 | 3¼ | A to B. |
| 6d | 80 | 155 | 130 | 6 | A to B. |
| 7d | 75 | 150 | 150 | 8 | B. |
| 8d | 85 | 140 | 140 | 5½ | A. |
| 9d | 85 | 138 | 110 | 1½ | A to B. |
| 10d | 80 | 156 | 105 | 3½ | A to B. |
| 11d | 90 | 180 | 150 | 1¼ | A to B. |
| 12d | 65 | 142 | 138 | 5¼ | A to B. |

Third addition

| Example No. Final Derivative | Amount of EtO added, (grams) | Max. Temp. °C. during Oxyeth. | Maximum Gauge Press. lb./sq. in. during Oxyeth. | Time required to complete Oxyeth., (hours) | Solubility [1] |
|---|---|---|---|---|---|
| 1d | 65 | 160 | 165 | 5 | C to D. |
| 4d | 65 | 158 | 155 | 4 | D. |
| 5d | 70 | 140 | 153 | 3¼ | C. |
| 6d | 80 | 140 | 130 | 7 | C. |
| 7d | 75 | 128 | 85 | 1½ | D. |
| 8d | 85 | 146 | 124 | 5 | C. |
| 9d | 85 | 155 | 85 | 7 | C. |
| 10d | 80 | 155 | 105 | 3½ | C. |
| 11d | 90 | 145 | 195 | 2 | C to D. |
| 12d | 65 | 153 | 140 | 4½ | D. |

[1] See end of table showing solubility characteristics indicated by letters A, B, C, etc.

Fourth addition

| Example No. Final Derivative | Amount of EtO added, (grams) | Max. Temp. °C. during Oxyeth. | Maximum Gauge Press. lb./sq. in. during Oxyeth. | Time required to complete Oxyeth., (hours) | Solubility [1] |
|---|---|---|---|---|---|
| 1d | 65 | 158 | 155 | 4½ | D to E. |
| 4d | 65 | 150 | 164 | 3¾ | E. |
| 5d | 70 | 162 | 130 | 2½ | D. |
| 6d | 80 | 138 | 120 | 3¾ | D. |
| 7d | 75 | 150 | 98 | 1½ | D to E. |
| 8d | 85 | 156 | 132 | 4½ | C to D. |
| 9d | 85 | 152 | 115 | 1½ | C to D. |
| 10d | 80 | 155 | 122 | 3½ | C to D. |
| 11d | 90 | 150 | 105 | 2 | C to D. |
| 12d | 65 | 160 | 128 | 3 | D to E. |

[1] Solubility of product after each addition of EtO.
A—Insoluble or very slightly soluble.
B—Distinctly becoming soluble.
C—Emulsifiable.
D—Soluble to give good suspension or sol.
E—Clear or almost clear solution.

In appearance, the final oxyethylated products in the presence of the solvent were, in general, liquids of varying viscosities, and being in color from light amber to dark brown. The viscosity varies from that of castor oil to somewhat less. The products dissolve in water to give suspensions, sols, and clear or almost clear solutions.

The foregoing description of the appearance, etc., of the final oxyethylated products with respect to which data are given in the table, relates to the properties of the products in the presence of the solvent. It is to be understood that when these products are used for demulsification, it is unnecessary to separate them from the solvent used in their preparation, and ordinarily commercial products will, if prepared with the use of a solvent, be distributed without removal of the solvent, and frequently with the addition of other solvent materials, other agents, etc.

Examples 1d, and subsequent examples, illustrate the addition of an amount of ethylene oxide equivalent to about four or five moles per phenolic hydroxyl present in the original resin. Such products have very desirable properties for various industrial applications, as noted. However, the amount of ethylene oxide may be double this amount, triple this amount, or even quadruple this amount. In other words, instead of adding four or five moles of ethylene oxide per phenolic nucleus, present in the original resin, one may add as much as 15 to 20 moles of ethylene oxide or other alkylene oxide.

Previous reference has been made to the ratio of alkylene oxide to add, and as we have previously pointed out, this can be predetermined, using laboratory tests. It is our actual preference, however, from a practical standpoint, to make tests on a small pilot plant scale. Our reason for doing so is that we make one run, and only one, and we have a complete series which shows the progressive effect of introducing the oxyalkylating agent, for instance, the ethyleneoxy radical. Our preference is as follows: We prepare a suitable esterified resin of the kind as exemplified by Example 1c, preceding. We use approximately eight pounds of such resin and four pounds of xylene and place the esterified resin and xylene in a suitable autoclave with an open reflux condenser. We then add a catalyst which may be 2% of caustic soda, based on the weight of resin employed. The caustic soda may be used as a 20% to 30% solution in water and the water of solution or formation may be removed by means of the reflux condenser and the customary phase-separating trap. We then shut off the reflux condenser and use the equipment as an autoclave only, and oxyethylate until a total of 60 pounds of ethylene oxide have been added, equivalent to 750% of the original resin. We prefer a temperature of about 150° to 160° C. We take samples at intermediate points, as indicated in the following table:

| Percentages | Pounds of Ethylene Oxide Added per 8-pound Batch |
|---|---|
| 50 | 4.0 |
| 66⅔ | 5.33 |
| 75 | 6.0 |
| 100 | 8.0 |
| 150 | 12.0 |
| 200 | 16.0 |
| 300 | 24.0 |
| 400 | 32.0 |
| 500 | 40.0 |
| 600 | 48.0 |
| 750 | 60.0 |

Oxyethylation to 750% can usually be completed within 30 hours and frequently more quickly.

The samples taken are rather small, for instance, 2 to 4 ounces, so that no correction need be made in regard to the residual reaction mass. Each sample is divided in two. One-half the sample is placed in an evaporating dish on the steam bath overnight so as to eliminate the xylene. Then 1.5% solutions are prepared from both series of samples, i. e., the series with xylene present and the series with xylene removed.

Mere visual examination of any samples in solution may be sufficient to indicate hydrophile character or surface activity, i. e., the product is soluble, forming a colloidal sol, or the aqueous solution foams or shows emulsifying property. All these properties are related through adsorption at the interface, for example, a gas-liquid interface or a liquid-liquid interface. If desired, surface-activity can be measured in any one of the usual ways, using a DuNouy tensiometer or dropping pipette, or any other procedure for measuring interfacial tension. Such tests are conventional and require no further description. Any compound having sub-surface-activity, and all derived from the same resin and oxyalkylated to a greater extent, i. e., those having a greater proportion of alkylene oxide, are useful for the practice of this invention.

Another reason why we prefer to use a pilot plant test of the kind above described is that we can use the same procedure to evaluate tolerance towards a trifunctional phenol such as hydroxybenzene or metacresol satisfactorily. Previous reference has been made to the fact that one can conduct a laboratory scale test which will indicate whether or not a resin, although soluble in solvent, will yield an insoluble rubbery product, i. e., a product which is neither hydrophile nor surface-active, upon oxyethylation, particularly extensive oxyethylation. It is also obvious that one may have a solvent-soluble resin derived from a mixture of phenols having present 1% or 2% of a trifunctional phenol which will result in an insoluble rubber at the ultimate stages of oxyethylation, even though there has been an intermediate esterification stage, and notwithstanding the fact that such cross-linking did not take place in the initial resinification stage or the first oxyalkylation stage. In other words, with resins of the kind described obtained from certain phenols which originally may have contained a very small amount of a trifunctional phenol, one may find that the addition of two or three moles of the oxyalkylating agent per phenolic nucleus, particularly ethylene oxide, to the final intermediate, i. e., the esterified product, gives a surface-active product, which is perfectly satisfactory, while more extensive oxyethylation yields an insoluble rubber, i. e., an unsuitable product. It is obvious that this present procedure of evaluating trifunctional phenol tolerance is more suitable than the previous procedure.

It may be well to call attention to one result which may be noted in a long, drawn-out oxyalkylation, particularly oxyethylation, which would not appear in a normally conducted reaction. Reference has been made to cross-linking and its effect on solubility, and also the fact that, if carried far enough, it causes incipient stringiness, then pronounced stringiness, usually followed by a semi-rubbery or rubbery stage. Incipient stringiness, or even pronounced stringiness, or even the tendency towards a rubbery stage, is not objectionable, so long as the final product is still hydrophile and at least sub-surface-active. Such uble one, is generated and a cyclic polymer of ethylene oxide is produced, indicated thus:

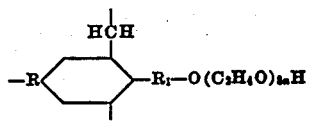 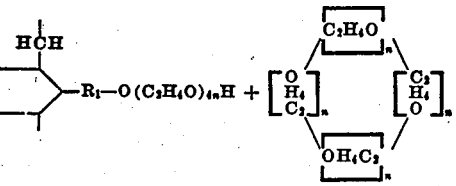

material frequently is best mixed with a polar solvent, such as alcohol or the like, and preferably an alcoholic solution is used. The point which we want to make here, however, is this: Stringiness or rubberization at this stage may possibly be the result of etherification. Obviously, if a difunctional phenol and an aldehyde produce a non-cross-linked resin, and if such molecule is treated in an initial manner as described, with an alkylene oxide, such as ethylene oxide, and hydroxyacetic acid, as described, it is obvious that during the final oxyethylation, if one introduces a plurality of ethoxy groups in each molecule, etherification can take place. If such etherification does take place, whether involving ethanol radicals or hydroxyacetic acid radicals, or both, it would amount to cross-linking, or in a general way, would have the same effect as if cross-linking took place in an earlier stage. Ordinarily, there is little or no tendency towards etherification during the final oxyalkylation step. If it does take place at all, it is only to an insignificant and unrecognizable degree. However, suppose that a certain weight of esterified resin is treated with an equal weight of, or twice its weight, of ethylene oxide. This may be done in a comparatively short time, for instance, at 150° or 175° C. in four to eight hours, or even less. On the other hand, if in an exploratory reaction, such as the kind previously described, the ethylene oxide were added extremely slowly, in order to take step-wise samples, so that the reaction required four or five times as long to introduce an equal amount of ethylene oxide employing the same temperature, then etherification might cause stringiness or a suggestion of rubberiness. For this reason, if in an exploratory experiment of the kind previously described, there appears to be any stringiness or rubberiness, it may be well to repeat the experiment and reach the intermediate stage of oxyalkylation as rapidly as possible and then proceed slowly beyond this intermediate stage. The entire purpose of this modified procedure is to cut down the time of reaction so as to avoid etherification if it be caused by the extended time period.

It may be well to note one peculiar reaction sometimes noted in the course of oxyalkylation, particularly oxyethylation, of the thermoplastic resins herein described. This effect is noted in a case where a thermoplastic resin ester derivative has been oxyalkylated, for instance, oxyethylated, until it gives a perfectly clear solution, even in the presence of some accompanying water-insoluble solvent, such as 10% to 15% of xylene. Further oxyalkylation, particularly oxyethylation, may then yield a product, which, instead of giving a clear solution, as previously, gives a very milky solution suggesting that some marked change has taken place. One explanation of the above change is that the structural unit indicated in the following way, where $8_n$ is a fairly large number, for instance, 10 to 20, decomposes and an oxyalkylated resin representing a lower degree of oxyethylation and a less soluble one, is generated and a cyclic polymer of ethylene oxide is produced, indicated thus:

This fact, of course, represents no difficulty for the reason that oxyalkylation can be conducted in each instance stepwise, or at a gradual rate, and samples taken at short intervals so as to arrive at a point where optimum surface activity or hydrophile character is obtained, if desired; for products for use in the practice of this invention, this is not necessary, and, in fact, may be undesirable, i. e., reduce the efficiency of the product.

We do not know to what extent oxyalkylation produces uniform distribution in regard to phenolic hydroxyls present in the resin molecule. In some instances, of course, such distribution can not be uniform, for the reason that we have not specified that the molecules of ethylene oxide, for example, be added in multiples of the units present in the resin molecule. This may be illustrated in the following manner:

Suppose that the original phenol-aldehyde resin happens to have five phenolic nuclei and that the esterified alkylene oxide resin likewise contains five hydroxyls, at least a majority or all being hydroxyacetic acid hydroxyls, and if not all, the others being either phenolic or alkanol hydroxyl radicals. If two moles of ethylene oxide are added after esterification based on the original phenolic nuclei are added, this would mean an addition of 10 moles of ethylene oxide, but suppose that one added 11 moles of ethylene oxide, or 12, or 13, or 14 moles; obviously, even assuming the most uniform distribution possible, some of the polyethyleneoxy radicals would contain 3 ethyleneoxy units and some would contain 2. Therefore, it is impossible to specify uniform distribution in regard to the entrance of the ethylene oxide or other oxyalkylating agent. For that matter, if one were to introduce 25 moles of ethylene oxide, there is no way to be certain that all chains of ethyleneoxy units would have 5 units; there might be some having, for example, 4 and 6 units, or for that matter, 3 or 7 units. Nor is there any basis for assuming that the number of molecules of the oxyalkylating agent added to each of the molecules of the resin is the same, or different. Thus, where formulae are given to illustrate or depict the oxyalkylated products, distributions of radicals indicated are to be statistically taken. We have, however, included specific directions and specifications in regard to the total amount of ethylene oxide, or total amount of any other oxyalkylating agent, to add.

In regard to solubility of the resins and the oxyalkylated compounds, and for that matter, derivatives of the latter, the following should be noted. In oxyalkylation, any solvent employed should be non-reactive to the alkylene oxide employed. This limitation does not apply to solvents used in cryoscopic determinations for obvious reasons. Attention is directed to the fact that various organic solvents may be employed to verify that the resin is organic solvent-soluble. Such solubility test merely characterizes the resin. The particular solvent used in such test may not be suitable for a molecular weight determination, and, likewise, the solvent used in determining molecular weight may not be suitable as a solvent during oxyalkylation. For solution of the oxyalkylated compounds, or their derivatives, a great variety of solvents may be employed, such as alcohols, ether alcohols, cresols, phenols, ketones, esters, etc., alone or with the addition of water. Some of these are mentioned hereafter. We prefer the use of benzene or diphenylamine as a solvent in making cryoscopic measurements. The most satisfactory resins are those which are soluble in xylene or the like, rather than those which are soluble only in some other solvent containing elements other than carbon and hydrogen, for instance, oxygen or chlorine. Such solvents are usually polar, semi-polar, or slightly polar in nature, compared with xylene, cymene, etc.

Reference to cryoscopic measurement is concerned with the use of benzene or other suitable compound as a solvent. Such method will show that conventional resins obtained, for example, from para-tertiary amylphenol and formaldehyde, in presence of an acid catalyst, will have a molecular weight indicating 3, 4, 5 or somewhat greater number of structural units per molecule. If more drastic conditions of resinification are employed, or if such low-stage resin is subjected to a vacuum distillation treatment, as previously described, one obtains a resin of a distinctly higher molecular weight. Any molecular weight determination used, whether cryoscopic measurement, or otherwise, other than the conventional cryoscopic one employing benzene, should be checked so as to insure that it gives consistent values on such conventional resins as a control. Frequently, all that is necessary to make an approximation of the molecular weight range is to make a comparison with the dimer obtained by chemical combination of two moles of the same phenol, and one mole of the same aldehyde under conditions to insure dimerization. As to the preparation of dimers from substituted phenols, see Carswell "Phenoplasts," page 31. The increased viscosity, resinous character, and decreased solubility, etc., of the higher polymers, in comparison with the dimer, frequently are all that is required to establish that the resin contains 3 or more structural units per molecule.

PART 5

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000, as in desalting practice, such an apparent insolubility in oil and water is not significant because said reagents undoubtedly have solubility within such concentrations. This same fact is true in regard to the material or materials employed as the demulsifying agent of our process.

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone, or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example, by agitating the tank of emulsion and slowly dripping demulsifier into the emulsion. In some cases, mixing is achieved by heating the emulsion while dripping in the demulsifier, depending upon the convection currents in the emulsion to produce satisfactory admixture. In a third modification of this type of treatment, a circulating pump withdraws emulsion from e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily, the flow of fluids through the subsequent lines and fittings suffices to produce the desired degree of mixing of demulsifier and emulsion, although in some instances, additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion, either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom, so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification, or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances, the esterified oxyalkylated products herein specified as demulsifiers can be conveniently used without dilution. However, as previously noted, they may be diluted as desired with any suitable solvent. For instance, by mixing 75 parts, by weight, of an oxyalkylated derivative, for example, the product of Example 1d, with 15 parts, by weight, of xylene and 10 parts, by weight, of isopropyl alcohol, an excellent demulsifier is obtained. Selection of the solvent will vary, depending upon the solubility characteristics of the oxyalkylated product, and, of course, will be dictated, in part, by economic considerations, i. e., cost.

As noted above, the products herein described may be used not only in diluted form, but also may be used admixed with some other chemical demulsifier. A combination illustrating such procedure is exemplified by the use of a mixture comprising:

Oxyalkylated derivative, for example, the product of Example 1d, 20%;
A cyclohexylamine salt of a polypropylated naphthalene monosulfonic acid, 24%;
An ammonium salt of a polypropylated naphthalene mono-sulfonic acid, 24%;
A sodium salt of oil-soluble mahogany petroleum sulfonic acid, 12%;
A high-boiling aromatic petroleum solvent, 15%;
Isopropyl alcohol, 5%.

The above proportions are all weight percents.

The instant application is concerned with the use of derivatives of oxyalkylated resinous compounds for demulsification of petroleum emulsions of the water-in-oil type. It is obvious that the alicyclic analogues derived by nuclear hydrogenation are equally serviceable for this purpose, and particularly as intermediates for the manufacture of more complex compounds for use as demulsifying agents. In a general way, conversion of the aromatic material to an alicyclic material follows either one or two procedures: One can hydrogenate the resin in a conventional manner, followed by oxyalkylation of the hydrogenated resin in substantially the same manner as is employed in the case of the non-hydrogenated resin. The second procedure is to hydrogenate the oxyalkylated derivative, rather than the resin itself. As an example of such procedure, reference is made to our co-pending application Serial No. 726,201, filed February 3, 1947 (now abandoned).

Having thus described our invention, what we claim as new and desire to secure by Letters Patent is:

1. A process for breaking petroleum emulsions of the water-in-oil type, characterized by subjecting the emulsion to the action of a demulsifier including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble, hydroxyacetic acid-esterified alkylene oxide-modified phenol-aldehyde resin; said resin being derived by reaction between a difunctional monohydric phenol and an aldehyde having not over 8 carbon atoms and reactive towards said phenol; said resin being formed in the substantial absence of trifunctional phenols; said phenol being of the formula:

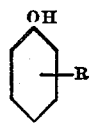

in which R is a hydrocarbon radical having at least 4 and not more than 12 carbon atoms and substituted in the 2,4,6 position; said resin being reacted with the aforementioned alkylene oxide so as to convert at least a majority of the phenolic hydroxyls per resin molecule into aliphatic hydroxyl radicals, but in a molecular proportion so that less than two moles of the alkylene oxide are used for each phenolic hydroxyl; said alkylene oxide-modified phenol-aldehyde resin being reacted with hydroxyacetic acid so as to convert at least a majority of the alkanol radicals replacing the phenolic hydroxyl radicals, but, in any event, at least two such alkanol radicals into the corresponding hydroxyacetic acid ester radicals, and, finally, said esterified alkylene oxide-modified phenol-aldehyde resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least two moles of alkylene oxide calculated on a total basis, both before and after esterification, be introduced for each phenolic nucleus present in the original unmodified phenol-aldehyde resin; and with the final proviso that the hydrophile properties of said final oxyalkylated resin in an equal weight of xylene are sufficient to produce an emulsion when said xylene solution is shaken vigorously with one to three volumes of water.

2. A process for breaking petroleum emulsions of the water-in-oil type, characterized by subjecting the emulsion to the action of a demulsifier including hydrophile synthetic products; said hydrophile synthetic products being oxyethylation products of (A) Ethylene oxide, and (B) an oxyethylation-susceptible, fusible, organic solvent-soluble, water-insoluble, hydroxyacetic acid-esterified ethylene oxide-modified phenol-aldehyde resin; said resin being derived by reaction between a difunctional monohydric phenol and an aldehyde having not over 8 carbon atoms and reactive towards said phenol; said resin being formed in the substantial absence of trifunctional phenols; said phenol being of the formula:

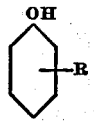

in which R is a hydrocarbon radical having at least 4 and not more than 12 carbon atoms and substituted in the 2,4,6 position; said resin being reacted with ethylene oxide so as to convert at least a majority of the phenolic hydroxyls per resin molecule into ethanol radicals, but in a molecular proportion so that less than two moles of the ethylene oxide are used for each phenolic hydroxyl; said ethylene oxide-modified phenol-aldehyde resin being reacted with hydroxyacetic acid so as to convert at least a majority of the ethanol radicals replacing the phenolic hydroxyl radicals, but, in any event, at least two ethanol radicals into the corresponding hydroxyacetic acid ester radical, and, finally, said esterified ethylene oxide-modified phenol-aldehyde resin being characterized by the introduction into the resin molecule of a plurality of divalent radicals having the formula $(C_2H_4O)_n$, wherein $n$ is a numeral varying from 1 to 20; with the proviso that at least two moles of ethylene oxide calculated on a total basis both before and after esterification be introduced for each phenolic nucleus present in the original unmodified phenol-aldehyde resin; and with the final proviso that the hydrophile properties of said final oxyethylated resin in an equal weight of xylene are sufficient to produce an emulsion when said xylene solution is shaken vigorously with one to three volumes of water.

3. A process for breaking petroleum emulsions of the water-in-oil type, characterized by subjecting the emulsion to the action of a demulsifier including hydrophile synthetic products; said hydrophile synthetic products being oxyethylation products of (A) Ethylene oxide, and (B) oxyethylation-susceptible, fusible, organic solvent-soluble, water-insoluble, hydroxyacetic acid-esterified ethylene oxide-modified low-stage phenol-aldehyde resin; said initial phenol-aldehyde resin having an average molecular weight corresponding to at least 3 and not over 7 phenolic nuclei per resin molecule; said resin being derived by reaction between a difunctional monohydric phenol and an aldehyde having not over 8 carbon atoms and reactive towards said phenol; said resin being formed in the substantial absence of trifunctional phenols; said phenol being of the formula:

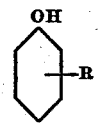

in which R is a hydrocarbon radical having at least 4 and not more than 12 carbon atoms and substituted in the 2,4,6 position; said resin being reacted with ethylene oxide so as to convert at least a majority of the phenolic hydroxyls per resin molecule into ethanol radicals, but in a molecular proportion so that less than two moles of the ethylene oxide are used for each phenolic hydroxyl; said ethylene oxide-modified phenol-aldehyde resin being reacted with hydroxyacetic acid so as to convert at least a majority of the ethanol radicals replacing the phenolic hydroxyl radicals, but, in any event, at least two ethanol radicals into the corresponding hydroxyacetic acid ester radical, and, finally, said esterified ethylene oxide-modified phenol-aldehyde resin being characterized by the introduction into the resin molecule of a plurality of divalent radicals having the formula $(C_2H_4O)_n$, wherein $n$ is a numeral varying from 1 to 20; with the proviso that at least two moles of ethylene oxide calculated on a total basis both before and after esterification be introduced for each phenolic nucleus present in the original unmodified phenol-aldehyde resin; and with the final proviso that the hydrophile properties of said final oxyethylated resin in an equal weight of xylene are sufficient to produce an emulsion when said xylene solution is shaken vigorously with one to three volumes of water.

4. A process for breaking petroleum emulsions of the water-in-oil type, characterized by subjecting the emulsion to the action of a demulsifier including hydrophile synthetic products; said hydrophile synthetic products being oxyethylation products of (A) Ethylene oxide, and (B) an oxyethylation-susceptible, fusible, organic solvent-soluble, water-insoluble, hydroxyacetic acid-esterified ethylene oxide-modified low-stage phenol-aldehyde resin; said initial phenol-aldehyde resin having an average molecular weight corresponding to at least 3 and not over 7 phenolic nuclei per resin molecule; said resin being derived by reaction between a difunctional monohydric phenol and an aldehyde having not over 8 carbon atoms and reactive towards said phenol; said resin being formed in the substantial absence of trifunctional phenols; said phenol being of the formula:

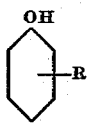

in which R is an aliphatic hydrocarbon radical having at least 4 and not more than 12 carbon atoms and substituted in the 2,4,6 position; said resin being reacted with ethylene oxide so as to convert at least a majority of the phenolic hydroxyls per resin molecule into ethanol radicals, but in a molecular proportion so that less than two moles of the ethylene oxide are used for each phenolic hydroxyl; said ethylene oxide-modified phenol-aldehyde resin being reacted with hydroxyacetic acid so as to convert at least a majority of the ethanol radicals replacing the phenolic hydroxyl radicals, but, in any event, at least two ethanol radicals into the corresponding hydroxyacetic acid ester radical, and, finally, said esterified ethylene oxide-modified phenol-aldehyde resin being characterized by the introduction into the resin molecule of a plurality of divalent radicals having the formula $(C_2H_4O)_n$, wherein $n$ is a numeral varying from 1 to 20; with the proviso that at least two moles of ethylene oxide calculated on a total basis both before and after esterification be introduced for each phenolic nucleus present in the original unmodified phenol-aldehyde resin; and with the final proviso that the hydrophile properties of said final oxyethylated resin in an equal weight of xylene are sufficient to produce an emulsion when said xylene solution is shaken vigorously with one to three volumes of water.

5. A process for breaking petroleum emulsions of the water-in-oil type, characterized by subjecting the emulsion to the action of a demulsifier including hydrophile synthetic products; said hydrophile synthetic products being oxyethylation products of (A) Ethylene oxide, and (B) an oxyethylation-susceptible, fusible, organic solvent-soluble, water-insoluble, hydroxyacetic acid-esterified ethylene oxide-modified low-stage phenol-aldehyde resin; said initial phenol-aldehyde resin having an average molecular weight corresponding to at least 3 and not over 7 phenolic nuclei per resin molecule; said resin being derived by reaction between a difunctional monohydric phenol and an aliphatic aldehyde having not over 8 carbon atoms and reactive towards said phenol; said resin being formed in the substantial absence of trifunctional phenols; said phenol being of the formula:

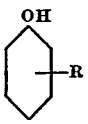

in which R is an aliphatic hydrocarbon radical having at least 4 and not more than 12 carbon atoms and substituted in the 2,4,6 position; said resin being reacted with ethylene oxide so as to convert at least a majority of the phenolic hydroxyls per resin molecule into ethanol radicals, but in a molecular proportion so that less than two moles of the ethylene oxide are used for each phenolic hydroxyl; said ethylene oxide-modified phenol-aldehyde resin being reacted with hydroxyacetic acid so as to convert at least a majority of the ethanol radicals replacing the phenolic hydroxyl radicals, but, in any event, at least two ethanol radicals into the corresponding hydroxyacetic acid ester radical, and, finally, said esterified ethylene oxide-modified phenol-aldehyde resin being characterized by the introduction into the resin molecule of a plurality of divalent radicals having the formula $(C_2H_4O)_n$, wherein $n$ is a numeral varying from 1 to 20; with the proviso that at least two moles of ethylene oxide calculated on a total basis both before and after esterification be introduced for each phenolic nucleus present in the original unmodified phenol-aldehyde resin; and with the final proviso that the hydrophile properties of said final oxyethylated resin in an equal weight of xylene are sufficient to produce an emulsion when said xylene solution is shaken vigorously with one to three volumes of water.

6. A process for breaking petroleum emulsions of the water-in-oil type, characterized by subjecting the emulsion to the action of a demulsifier including hydrophile synthetic products; said hydrophile synthetic products being oxyethylation products of (A) Ethylene oxide, and (B) an oxyethylation-susceptible, fusible, organic solvent-soluble, water-insoluble, hydroxyacetic acid-esterified ethylene oxide-modified low-stage phenol-aldehyde resin; said initial phenol-aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of trifunctional phenols; said phenol being of the formula:

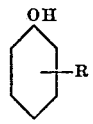

in which R is an aliphatic hydrocarbon radical having at least 4 and not more than 12 carbon atoms and substituted in the 2,4,6 position; said resin being reacted with ethylene oxide so as to convert at least a majority of the phenolic hydroxyls per resin molecule into ethanol radicals, but in a molecular proportion so that less than two moles of the ethylene oxide are used for each phenolic hydroxyl; said ethylene oxide-modified phenol-aldehyde resin being reacted with hydroxyacetic acid so as to convert at least a majority of the ethanol radicals replacing the phenolic hydroxyl radicals, but, in any event, at least two ethanol radicals into the corresponding hydroxyacetic acid ester radical, and, finally, said esterified ethylene oxide-modified phenol-aldehyde resin being characterized by the introduction into the resin molecule of a plurality of divalent radicals having the formula $(C_2H_4O)_n$, wherein $n$ is a numeral varying from 1 to 20; with the proviso that at least two moles of ethylene oxide calculated on a total basis both before and after esterification be introduced for each phenolic nucleus present in the original unmodified phenol-aldehyde resin; and with the final proviso that the hydrophile properties of said final oxyethylated resin in an equal weight of xylene are sufficient to produce an emulsion when said xylene solution is shaken vigorously with one to three volumes of water.

7. A process for breaking petroleum emulsions of the water-in-oil type, characterized by subjecting the emulsion to the action of a demulsifier including hydrophile synthetic products; said hydrophile synthetic products being oxyethylation products of (A) Ethylene oxide, and (B) an oxyethylation-susceptible, fusible, organic solvent-soluble, water-insoluble, hydroxyacetic acid-esterified ethylene oxide-modified low-stage acid-catalyzed phenol-aldehyde resin; said initial phenol-aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of trifunctional phenols; said phenol being of the formula:

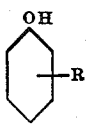

in which R is an aliphatic hydrocarbon radical having at least 4 and not more than 12 carbon atoms and substituted in the 2,4,6 position; said resin being reacted with ethylene oxide so as to convert at least a majority of the phenolic hydroxyls per resin molecule into ethanol radicals, but in a molecular proportion so that less than two moles of the ethylene oxide are used for each phenolic hydroxyl; said ethylene oxide-modified phenol-aldehyde resin being reacted with hydroxyacetic acid so as to convert at least a majority of the ethanol radicals replacing the phenolic hydroxyl radicals, but, in any event, at least two ethanol radicals into the corresponding hydroxyacetic acid ester radical, and, finally said esterified ethylene oxide-modified phenol-aldehyde resin being characterized by the introduction into the resin molecule of a plurality of divalent radicals having the formula $(C_2H_4O)_n$, wherein $n$ is a numeral varying from 1 to 20; with the proviso that at least two moles of ethylene oxide calculated on a total basis both before and after esterification be introduced for each phenolic nucleus present in the original unmodified phenol-aldehyde resin; and with the final proviso that the hydrophile properties of said final oxyethylated resin in an equal weight of xylene are sufficient to produce an emulsion when said xylene solution is shaken vigorously with one to three volumes of water.

8. The process of claim 5, wherein R is substituted in the para position.

9. The process of claim 5, wherein R is a butyl radical substituted in the para position.

10. The process of claim 5, wherein R is an amyl radical substituted in the para position.

11. The process of claim 5, wherein R is an octyl radical substituted in the para position.

12. The process of claim 6, wherein R is substituted in the para position.

13. The process of claim 6, wherein R is a butyl radical substituted in the para position.

14. The process of claim 6, wherein R is an amyl radical substituted in the para position.

15. The process of claim 6, wherein R is an octyl radical substituted in the para position.

16. The process of claim 7, wherein R is substituted in the para position.

17. The process of claim 7, wherein R is a butyl radical substituted in the para position.

18. The process of claim 7, wherein R is an amyl radical substituted in the para position.

19. The process of claim 7, wherein R is an octyl radical substituted in the para position.

MELVIN DE GROOTE.
BERNHARD KEISER.

REFERENCES CITED

The following references are of record in the file of this patent:

UNITED STATES PATENTS

| Number | Name | Date |
|---|---|---|
| 2,076,624 | De Groote | Apr. 13, 1937 |
| 2,307,058 | Moeller | Jan. 5, 1943 |
| 2,340,355 | Wirtel | Feb. 1, 1944 |
| 2,430,002 | De Groote et al. | Nov. 4, 1947 |
| 2,430,003 | De Groote et al. | Nov. 4, 1947 |
| 2,454,541 | Bock et al. | Nov. 23, 1948 |
| 2,454,545 | Bock et al. | Nov. 23, 1948 |